United States Patent
Sidebottom et al.

(10) Patent No.: US 11,606,269 B1
(45) Date of Patent: *Mar. 14, 2023

(54) SERVICE PLACEMENT ASSISTANCE

(71) Applicant: Juniper Networks, Inc., Sunnyvale, CA (US)

(72) Inventors: Gregory A. Sidebottom, Ottawa (CA); Kireeti Kompella, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/657,260

(22) Filed: Mar. 30, 2022

Related U.S. Application Data

(63) Continuation of application No. 17/459,205, filed on Aug. 27, 2021, now Pat. No. 11,323,339.

(51) Int. Cl.
*G06F 15/173* (2006.01)
*H04L 41/5061* (2022.01)
*H04L 47/70* (2022.01)

(52) U.S. Cl.
CPC ........ *H04L 41/5061* (2013.01); *H04L 47/827* (2013.01)

(58) Field of Classification Search
None
See application file for complete search history.

(56) References Cited

U.S. PATENT DOCUMENTS

| | | | |
|---|---|---|---|
| 10,069,693 B1 * | 9/2018 | Daptardar | H04L 41/5054 |
| 10,129,094 B1 * | 11/2018 | Seetharaman | H04L 47/76 |
| 10,362,099 B2 * | 7/2019 | Pai | G06F 9/46 |
| 10,721,168 B1 | 7/2020 | Sidebottom | |

(Continued)

FOREIGN PATENT DOCUMENTS

| | | | |
|---|---|---|---|
| WO | 2016161394 A1 | 10/2016 | |
| WO | 2016209653 A1 | 12/2016 | |
| WO | WO-2016209653 A1 * | 12/2016 | ............... G06F 9/46 |

OTHER PUBLICATIONS

"Gojq," GitHub, Inc., itchyny, Retrieved Jan. 25, 2022 from: https://web.archive.org/web/20210525165758/https://github.com/itchyny/gojq, Accessed date: May 25, 2021. 6 pp.

"Jq," Bootstrap, Retrieved Jan. 25, 2022 from: https://web.archive.org/web/20210614174301/https://stedolan.github.io/jq/, Accessed date: Jun. 14, 2021, 2 pp.

(Continued)

*Primary Examiner* — Phyllis A Book
(74) *Attorney, Agent, or Firm* — Shumaker & Sieffert, P.A.

(57) ABSTRACT

An example computing device is configured to receive, from a customer device, an indication of a plurality of resources and an indication of a plurality of customer services, each of the plurality of customer services being associated with a corresponding at least one requirement and a corresponding at least one constraint. The computing device is configured to automatically determine, for each requirement and each constraint, whether the requirement or the constraint can only be satisfied by a particular resource of the plurality of resources, and allocate, based on the determining, at least one resource of the plurality of resources to at least one customer service of the plurality of customer services. The example computing device is configured to provide, to the customer device and subsequent to the determining for every requirement and for every constraint, information to enable the customer device to provision the at least one customer service.

20 Claims, 12 Drawing Sheets

(56) References Cited

U.S. PATENT DOCUMENTS

| | | | |
|---|---|---|---|
| 10,887,185 B1 | 1/2021 | Sidebottom | |
| 11,080,097 B1* | 8/2021 | Panghal | G06F 9/5027 |
| 11,323,339 B1 | 5/2022 | Sidebottom et al. | |
| 2014/0074641 A1* | 3/2014 | Wang | G06Q 30/08 718/103 |
| 2014/0244842 A1* | 8/2014 | Rosensweig | H04L 67/10 709/226 |
| 2015/0046279 A1* | 2/2015 | Wang | G06F 9/5027 705/26.3 |
| 2016/0381128 A1* | 12/2016 | Pai | H04L 41/0816 709/203 |
| 2017/0264486 A1* | 9/2017 | Angell | H04L 43/16 |
| 2019/0095249 A1* | 3/2019 | Wang | G06F 9/50 |
| 2020/0177518 A1 | 6/2020 | Jain et al. | |
| 2020/0334586 A1* | 10/2020 | Petroulas | H04L 47/827 |

OTHER PUBLICATIONS

Barguil et al., "A Layer 2 VPN Network YANG Model; draft-barguil-opsawg-l2sm-l2nm-02," Internet Engineering Task Force (IETF), Internet-Draft, May 26, 2020, 93 pp.

Barguil et al., "A Layer 3 VPN Network YANG Model; draft-ietf-opsawg-l3sm-l3nm-05," Internet Engineering Task Force (IETF), Internet-Draft, Oct. 16, 2020, 105 pp.

Clemm et al., "A Yang Data Model for Network Topologies" Internet Engineering Task Force (IETF) RFC 8345, Mar. 2018, 57 pp.

Extended Search Report from counterpart European Application No. 21209306.6 dated Apr. 25, 2022, 11 pp.

Moberg et al., "A two-layered data model approach for network services," IEEE Communications Magazine, vol. 54, Issue: 3, Mar. 2016, pp. 76-80.

Papazoglou et al., "Service oriented architectures", VLDB Journal, vol. 16, No. 3, Jul. 1, 2007, pp. 389-415.

Prosecution History from U.S. Appl. No. 17/459,205, now U.S. Pat. No. 11,323,339, dated Feb. 15, 2022 through Mar. 10, 2022, 11 pp.

U.S. Appl. No. 17/459,231, filed Aug. 27, 2021, naming inventors Sidebottom et al.

Wen et al., "A YANG Data Model for Layer 2 Virtual Private Network (L2VPN) Service Delivery," Internet Engineering Task Force (IETF) RFC 8466, Oct. 2018, 158 pp.

Wu et al., "YANG Data Model for L3VPN Service Delivery," Internet Engineering Task Force (IETF) RFC 8299, Jan. 2018, 188 pp.

Office Action from U.S. Appl. No. 17/459,231, dated Jun. 21, 2022, 14 pp.

Response to Office Action dated Jun. 21, 2022 from U.S. Appl. No. 17/459,231, filed Sep. 21, 2022, 15 pp.

Final Office Action from U.S. Appl. No. 17/459,231 dated Dec. 22, 2022, 20 pp.

\* cited by examiner

SERVICE PLACEMENT ASSISTANCE

This application is a continuation of U.S. patent application Ser. No. 17/459,205, filed 27 Aug. 2021, the entire contents of which is incorporated herein by reference.

TECHNICAL FIELD

The disclosure relates to resource allocation, such as resource allocation within a computer network.

BACKGROUND

Networks may include a plurality of different network devices configured to provide customer services to customers. Such customer services may include virtual private network services, traffic engineering services, Voice-over-IP (VoIP) services, Video-on-Demand (VOD) services, bulk transport services, walled/open gardens, IP Mobility Subsystem (IMS) and other mobility services, firewall services, and Internet services to clients of the service provider network and route flows of packets traveling from a source device to a destination device. To provide such customer services, network devices must be provisioned to support such services. Manually provisioning such network devices to support such services in a large network is exceedingly difficult without performing such provisioning in an inefficient manner which increases customer costs.

SUMMARY

In general, the disclosure describes techniques to enable a computing device to automatically allocate resources, such as network resources, to satisfy or meet customer service requirements and associated constraints, and/or to assist operators with optimizing the allocation of resources. While the techniques of this disclosure are primarily discussed for purposes of example with respect to computer networking, the techniques may be applicable to any field having a need for resource allocation, such as manufacturing, distribution of goods or services, or the like.

Automated service provisioning may be useful to service providers, such as network service providers. However, automated service provisioning may be difficult to implement because every service provider may have widely varying requirements, ranging from what services they want to provide and how to implement the services on their network. As a result, service provisioning platforms are often built as one-off customer-specific applications with little opportunity for reuse for different customers. Generalized products that apply to a wide variety of customers and services may require intensive customization via expensive professional services or system integration projects. Moreover, existing service provisioning platforms have limited ability to allocate and manage the assignment of network resources to services to be deployed on the network. Therefore, allocating network resources to customer requirements is largely a manual process.

Service providers may use any model they like for network resources and customer services, choosing from existing standard models, and enhanced models customized to fit their goals. The techniques of this disclosure include the use of an internal placement model within the computing device. The computing device may map or translate an instance of a customer service model, an instance of a network service model, and/or an instance of a network resource model, to the internal placement model such that resources and customer services, as well as associated requirements and constraints, represented in the customer service instance, network service instance, and/or network resource instance are represented in the internal placement model for resource allocation purposes. For example, one or more algorithms may receive, as input, instances of the customer service model, network service model, and/or network resource model and map these instances to the internal placement model which is used internally by the computing device for allocation of resources to customer service requirements. Information relating to the allocations may be input to one or more algorithms of the computing device to "inverse map" (e.g., translate) the placed services into a form that is consumable by a customer device (e.g., a network controller), such as an instance of a network service model in use in the network. In some examples, the instance of the network service model may contain information to enable the customer device to provision the customer services, such as all the information needed to provision the customer services.

Additionally, placement of customer service requirements on network resources is difficult in the presence of constraints on how different combinations of customer service requirements may be satisfied. Service providers resources are utilized relatively inefficiently as a result. This disclosure addresses this problem as a constraint optimization problem, thereby enabling automatic and/or assisted placement of service requirements onto resources, such as network resources, in a way that best satisfies the requirements, minimizes disruption, and relatively efficiently uses the network resources. The techniques of this disclosure may enable service providers to provide more value to their customers at a lower cost, as resources may be allocated for better utilization and to operate in a more efficient manner.

For example, a computing device may receive information indicative of a plurality of resources and receive information indicative of a plurality of customer services, each associated with at least one requirement and/or at least one constraint. In some examples, the computing device may automatically allocate the plurality of resources to the customer services such that the constraints associated with the customer services are satisfied. In some examples, the computing device may assist a service provider to optimize the allocation of a plurality of resources of a resource pool to satisfy the constraints associated with the customer services.

There can be thousands of different possible allocations of resources to customer services, particularly where the resources are network resources. Each customer service may have its own requirements. Thus, manual allocation can be both impractical given the number of permutations of possible allocations to satisfy requirements and constraints associated with each customer service, and subject to risk of overloading one or more of the resources.

The techniques of this disclosure may provide technical advantages over current systems. For example, the techniques provide an automated way for a computing device to allocate, or assist in allocating, resources to customer services that include requirements and may be associated with one or more constraints, while avoiding leaving requirements and constraints unsatisfied. The techniques described herein can be incorporated into a practical application such as a computing device that obtains an indication of a plurality of resources and an indication of a plurality of customer services each having one or more requirements and/or one or more constraints and uses the indications to automatically allocate, or assist a service provider to allocate, the resources to the customer services in a manner that satisfies the constraints.

In one example, a method includes receiving, by a computing device having one or more processors and from a customer device, an indication of a plurality of resources; receiving, by the computing device and from the customer device, an indication of a plurality of customer services, each of the plurality of customer services being associated with a corresponding at least one requirement and a corresponding at least one constraint; automatically determining, by the computing device and for each requirement and each constraint, whether the requirement or the constraint can only be satisfied by a particular resource of the plurality of resources; allocating, by the computing device and based on the determining, at least one resource of the plurality of resources to at least one customer service of the plurality of customer services; and providing, by the computing device to the customer device and subsequent to the determining for every requirement and for every constraint, information to enable the customer device to provision the at least one customer service.

In another example, a computing device includes one or more processors; and a non-transitory computer-readable medium having instructions stored thereon to cause the one or more processors to: receive, from a customer device, an indication of a plurality of resources; receive, from the customer device, an indication of a plurality of customer services, each of the plurality of customer services being associated with a corresponding at least one requirement and a corresponding at least one constraint; automatically determine, for each requirement and each constraint, whether the requirement or the constraint can only be satisfied by a particular resource of the plurality of resources; allocate, based on the determining, at least one resource of the plurality of resources to at least one customer service of the plurality of customer services; and provide, to the customer device and subsequent to the determining for every requirement and for every constraint, information to enable the customer device to provision the at least one customer service.

In a further example, a non-transitory computer-readable medium includes instructions for causing at least one programmable processor to: receive, from a customer device, an indication of a plurality of resources; receive, from the customer device, an indication of a plurality of customer services, each of the plurality of customer services being associated with a corresponding at least one requirement and a corresponding at least one constraint; automatically determine, for each requirement and each constraint, whether the requirement or the constraint can only be satisfied by a particular resource of the plurality of resources; allocate, based on the determining, at least one resource of the plurality of resources to at least one customer service of the plurality of customer services; and provide, to the customer device and subsequent to the determining for every requirement and for every constraint, information to enable the customer device to provision the at least one customer service.

In one example, a method includes receiving, by a computing device having one or more processors and from a customer device, an instance of a customer service model representative of a plurality of customer services, each of the plurality of customer services associated with a corresponding at least one requirement and a corresponding at least one constraint; receiving, by the computing device and from the customer device, an instance of a resource model representative of a plurality of resources; mapping, by the computing device, the instance of the customer service model and the instance of the resource model to an internal placement model maintained by the computing device; automatically allocating, by the computing device and using the internal placement model, the plurality of resources to the plurality of customer services such that the allocation of the plurality of resources satisfies the at least one requirement and the at least one constraint for each of the plurality of customer services; generating, by the computing device and responsive to the allocating, data indicating how the plurality of resources are allocated to the plurality of customer services; inverse mapping, by the computing device, the data indicating how the plurality of resources are allocated to the plurality of resources to a format consumable by the customer device; and outputting, by the computing device to the customer device, the inverse mapped data indicating how the plurality of resources are allocated to the plurality of customer services.

In another example, a computing device includes one or more processors; and a non-transitory computer-readable medium having instructions stored thereon to cause the one or more processors to: receive, from a customer device, an instance of a customer service model representative of a plurality of customer services, each of the plurality of customer services associated with a corresponding at least one requirement and a corresponding at least one constraint; receive, from the customer device, an instance of a resource model representative of a plurality of resources; map the instance of the customer service model and the instance of the resource model to an internal placement model maintained by the computing device; automatically allocate, using the internal placement model, the plurality of resources to the plurality of customer services such that the allocation of the plurality of resources satisfies the at least one requirement and the at least one constraint for each of the plurality of customer services; generate, responsive to the allocating, data indicating how the plurality of resources are allocated to the plurality of customer services; inverse map the data indicating how the plurality of resources are allocated to the plurality of resources to a format consumable by the customer device; and output, to the customer device, the inverse mapped data indicating how the plurality of resources are allocated to the plurality of customer services.

In a further example, a non-transitory computer-readable medium includes instructions for causing at least one programmable processor to: receive, from a customer device, an instance of a customer service model representative of a plurality of customer services, each of the plurality of customer services associated with a corresponding at least one requirement and a corresponding at least one constraint; receive, from the customer device, an instance of a resource model representative of a plurality of resources; map the instance of the customer service model and the instance of the resource model to an internal placement model maintained by the computing device; automatically allocate, using the internal placement model, the plurality of resources to the plurality of customer services such that the allocation of the plurality of resources satisfies the at least one requirement and the at least one constraint for each of the plurality of customer services; generate, responsive to the allocating, data indicating how the plurality of resources are allocated to the plurality of customer services; inverse map the data indicating how the plurality of resources are allocated to the plurality of resources to a format consumable by the customer device; and output, to the customer device, the inverse mapped data indicating how the plurality of resources are allocated to the plurality of customer services.

The details of one or more examples are set forth in the accompanying drawings and the description below. Other features, objects, and advantages will be apparent from the description and drawings, and from the claims.

DETAILED DESCRIPTION

When attempting to manually allocate resources, such as network resources, to satisfy requirements and constraints associated with customer services, a person may be faced with thousands of options for each customer service. The choice of placement of each customer service may affect the placement of each succeeding customer service, as resources have already been allocated to previous customer services. As such, manual placement may be fraught with risks, as allocating an already-allocated resource may overload the resource and result in lost traffic. As noted above, manual allocation can be impractical given the large number of different combinations of potential allocations, especially in networks having large numbers of network devices. A technical advantage of the techniques disclosed herein over existing systems is a computing device that can automatically determine an allocation, or assist in an allocation of resources, to satisfy requirements and constraints associated with the customer services and avoid overloading network devices. Furthermore, the techniques of this disclosure may transform data from a form used by a network device, such as a network controller, to a form usable by a computing device to determine the allocation and then to transform data indicative of the allocation back into a format consumable by the network device.

Customer service placement may be a Service Lifecycle Management (SLM) function that allocates resources to satisfy the needs of a customer service subject to requirements and constraints. In the context of a computer network, these resources may include router interfaces which have a type (e.g., ethernet, digital subscriber line (DSL), leased line (LL), mobile, etc.), memory (for route tables for example), bandwidth, route distinguishers (which may distinguish a route from another route), route targets, addresses and prefixes, and the like. Some examples of constraints include: the customer equipment (CE) access interface types must match the allocated provider edge interface type, the customer site must be in the same region as the point-of-presence (POP) where the PE servicing the site is located, a pair of customer accesses must be connected to PEs in different points of presence (e.g., for robustness in the presence of network outages), and the like. Examples of requirements may include an interface type, a bandwidth, a number of supportable routes, and a maximum cost.

Figure 1:
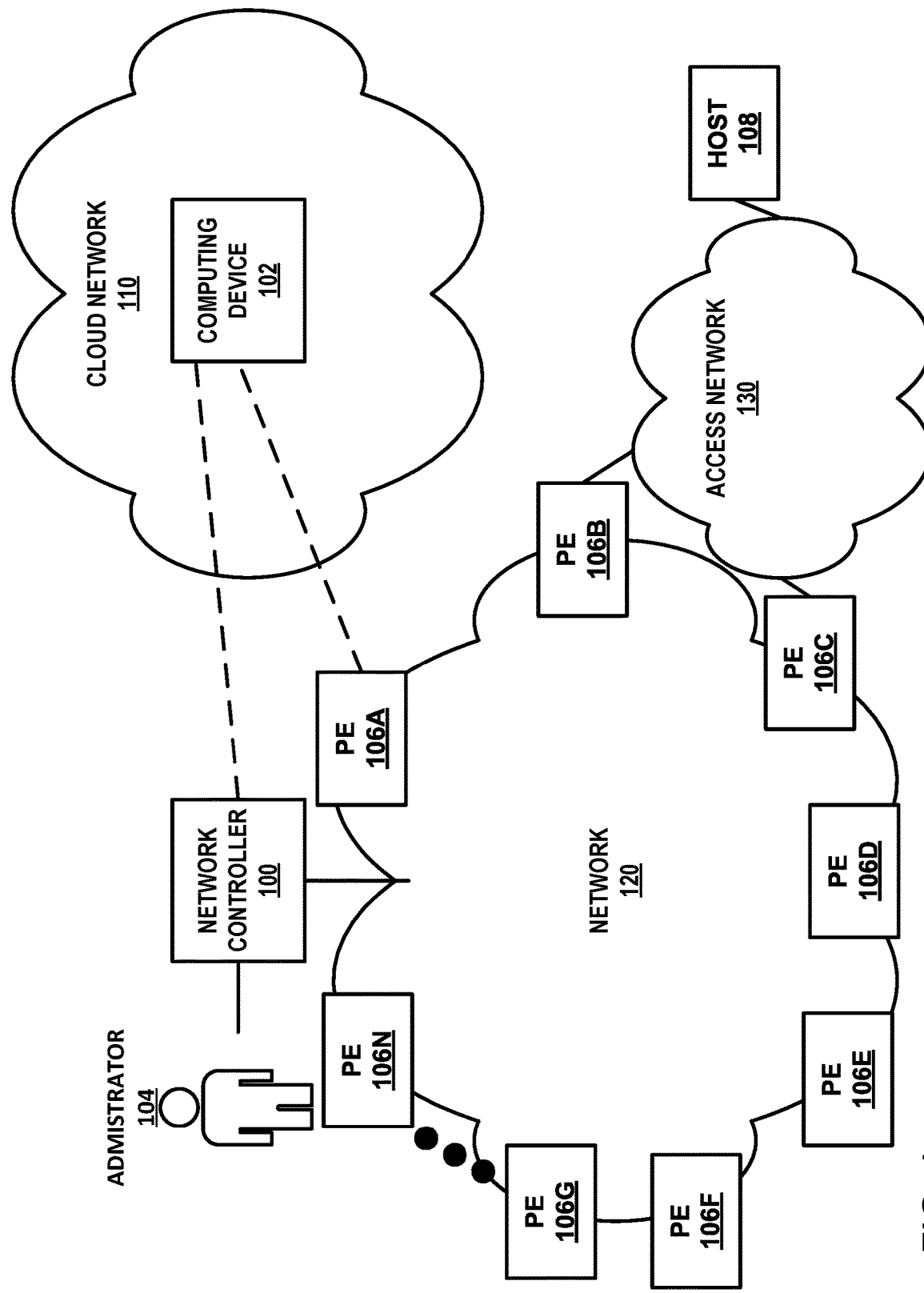
FIG. 1 is a conceptual diagram illustrating an example network and cloud computing device according to techniques of this disclosure.

FIG. 1 is a conceptual diagram illustrating an example network and cloud computing device according to techniques of this disclosure. Network 120 may be a service provider network that may provide customer services to host devices, such as host device 108, via an access network, such as access network 130. In order to provide such customer services network controller 100 may need to provision network resources, such as provider edge routers (PEs), such as PE routers 106A-106N (hereinafter referred to as PEs 106), and, in some examples, other network devices (not shown). Customer services may be associated with certain requirements, such as an interface type, a bandwidth, a number of supportable routes, and/or a maximum cost.

Administrator 104 may interact with network controller 100 via a user interface to manually provision PEs 106 and the other network devices to provide such customer services. However, when network 120 includes a large number of network devices and there are a large number of customer services to be placed on the network devices, determining how to allocate the network resources, such as PEs 106, may be exceedingly difficult without overburdening one or more of the network devices. When a network device becomes overburdened, the network device may drop traffic which may result in a customer service not being provided as per the original requirements for that customer service. This may all be further complicated by additional constraints beyond the requirements of the customer service. For example, a constraint may be that a customer service must use two different PEs (e.g., PE 106C and PE 106B for redundancy purposes in case of a failure of a primary PE). Because manual placement of services is so difficult when dealing with thousands of network devices and thousands of customer services having thousands of requirements and thousands of constraints, networks in which customer services are manually placed are most often inefficient, resulting in higher costs as a larger number of network resources are needed than if the customer services were placed on the network resources in an automated manner or a semi-automated manner (e.g., with assistance from another computing device.).

To place customer services, administrator 104 may, through network controller 100, communicate with computing device 100 such as transmitting to computing device 100 a service instance. The service instance may be a work order for computing device 100 to determine placements of customer services on various network resources of network 120. The service instance may include an instance of a customer service model (a customer service instance), an instance of a network service model (a network service instance) which may be indicative of already allocated existing network resources to customer services, and/or, for example when there are new network resources, an instance of a network resource model (a network resource instance). These models may be unique to network controller 100 such that they may not be the same as models used by another network controller of another network (not shown).

Computing device 100 may be located in a cloud computing environment, such as in cloud network 110. In some examples, administrator 104 and network controller 100 may communicate with computing device 102 via network 120 and PE 106A. In other examples, administrator 104 and network controller 100 may communicate with computing device 102 via another route. Computing device 102 may be configured to receive the service instance, map or translate the customer service instance, the network service instance, and/or the network resource instance into an internal placement model used by computing device 102.

In some examples, computing device 102 may automatically place the customer services represented in the customer service instance onto the network resources represented in the network service instance or the network resource instance. In other examples, administrator 104 may interact with computing device 102 via network controller 100 to manually place the customer services on the network resources. In such a case, computing device 102 may be configured to output an indication, for display to administrator 104, of any problem that may arise because of the manual placement. In other examples, computing device 102 may assist administrator 104 in placing the customer services on the network resources.

Once computing device 102 has determined placement of the customer services represented in the customer service instance to network resources represented in the network resource instance, computing device 102 may map an updated network services instance into the network service model format used by network controller 100 and transmit to network controller 100 the updated network service instance. This updated network service instance may include information relating to how the customer services are to be placed on the network resources. In some examples, the network service instance includes all the information necessary for network controller 100 to provision the network resources, such as PEs 106, to satisfy both the requirements of the customer services and any associated constraints. In this manner, network controller 100 may provision the network resources such that a customer service being used by host 108 satisfies any expectations of host 108.

In some examples, a maximum cost may be a requirement, such as the cost of the service must be less than $400. For example, cost functions of bandwidth can be associated with network elements such as tunnels, peer links, internal routes, and external routes. In examples where cost is a requirement or constraint, computing device 102 may use the cost functions to evaluate different ways of placing customer services. In some aspects, the cost function for a tunnel or internal route can be related to the number of links a tunnel or internal route traverses or inversely related to the delay the tunnel or internal route incurs.

Figure 2:
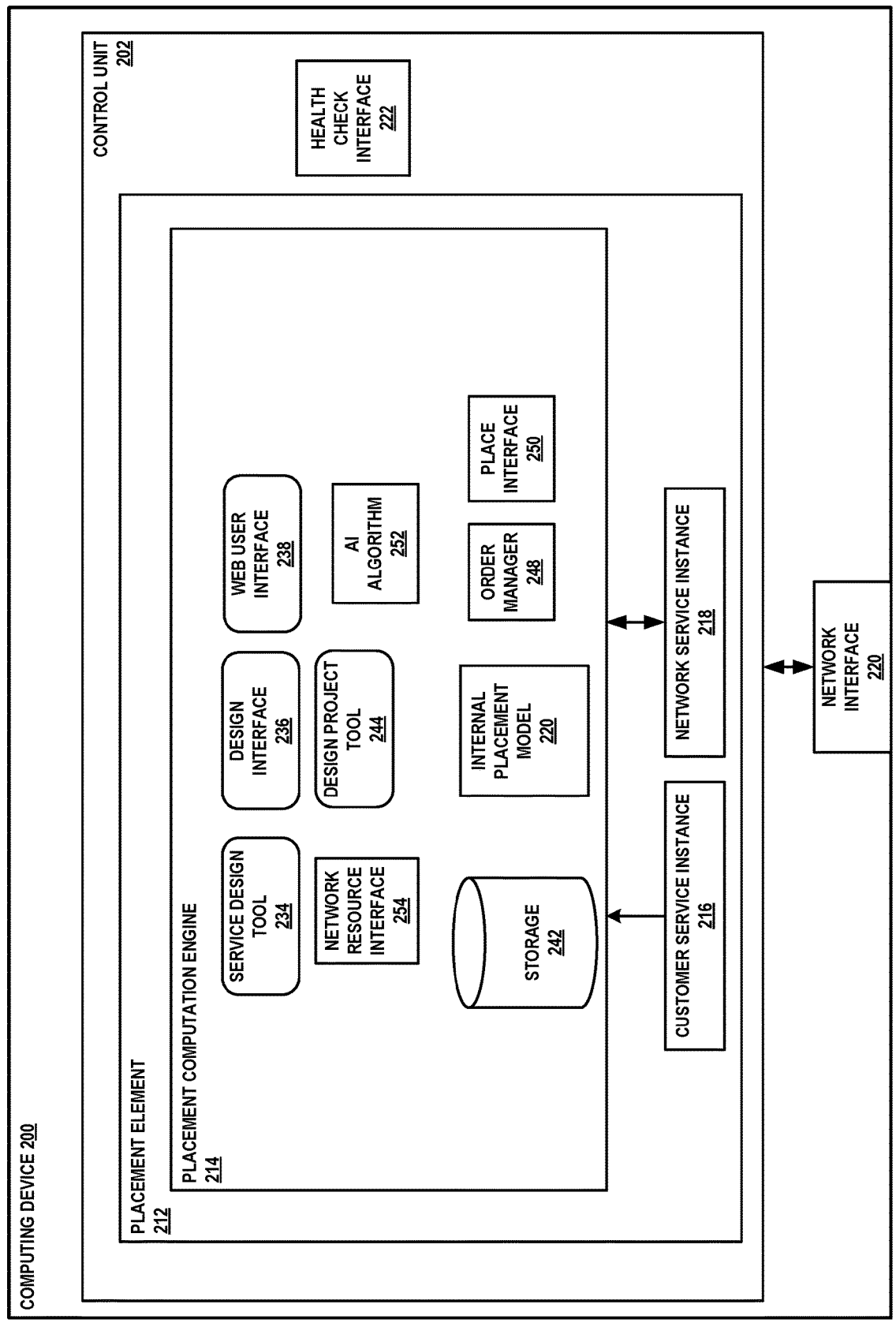
FIG. 2 is a block diagram illustrating an example computing device that may determine placement of customer services on resources in accordance with techniques of this disclosure.

FIG. 2 is a block diagram illustrating an example computing device that may determine placement of customer services on resources in accordance with techniques of this disclosure. Computing device 200 may be an example of computing device 102 of FIG. 1. Computing device 200 receives service instances from network controller 100 (FIG. 1) or a network controller of another network, and maps such service instances into an internal placement model of computing device 200. Computing device 200 places, or assists in placing, customer services associated with the service instance on network resources associated with a network resource instance. Computing device 200 maps the placed customer services into a network service instance that is consumable by network controller 100 and transmits the network service instance to network controller 100.

Computing device 200 may include control unit 202 coupled to network interface 220 to exchange packets with other network devices such as network controller 100 (FIG. 1), by an inbound link and outbound link. Network interface 220 may be an interface which is utilized by administrator 104 (FIG. 1) to communicate with computing device 200. In some examples, network interface 220 supports three external interfaces for placement of services. For example, a first external interface of network interface 220 may be an interface for activating placement designs which may map allocated placements to a customer's network and service models. A second external interface of network interface 220 may be a resources interface for managing the pools of resources on which customer services may be placed in terms of NIs. A third external interface of network interface 220 may be an interface for managing the service instances that are placed on the network resources of the network resource pools. Network interface 220 may receive customer service instance 216 and may receive and/or output network service instance 218. Customer service instance 216 may be an instance of a customer service model used by a customer to represent customer services and network service instance 218 may be an instance of a network service model used by the customer to indicate the allocation of network resources to customer services.

Control unit 202 may include one or more processors (not shown in FIG. 2) that execute software instructions, such as those used to define a software or computer program, stored to a computer-readable storage medium, such as storage 242, which may be a non-transitory computer-readable mediums including a storage device (e.g., a disk drive, or an optical drive) or a memory (such as Flash memory or random access memory (RAM)) or any other type of volatile or non-volatile memory, that stores instructions to cause the one or more processors to perform the techniques described herein. Alternatively, or additionally, control unit 202 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 202 provides an operating environment for placement element 212. Placement element 212 may include placement computation engine 214 which may be configured to generate placements of customer services on network resources. In some examples, placement element 212 or placement computation engine 214 may be implemented as one or more processes executing on one or more virtual machines of one or more servers. That is, while generally illustrated and described as executing on a single computing device 200, aspects of these components may be delegated to other computing devices.

Placement computation engine 214 may include internal placement model 220. Internal placement model 220 may be a model used internally to computing device 200 when generating placements of customer services on network resources. Placement computation engine 214 may also include design interface 236 and web user interface 238. Design interface 236 may be configured to accept commands from administrator 104, such as to activate network and service designs, and cause placement computation engine 214 to execute on those commands. Design interface 236 may also be configured to interact with a file system-based design project tool 244 which contains model-based designs that can be activated, created, and tested via design interface 236. For example, design interface 236 may read design projects and include functionality for testing designs against example model instances.

Service design tool 234 may both instantiate a placement service internally or connect to an external placement service. Service design tool 234 may have a terminal based user interface and may also be run in a "headless" mode via automation scripts. Service design tool 234 may support exercising all the placement service functions based on the designs and example instances contained in a design project. In some examples, service design tool 234, may be an executable program that administrator 104 may use for constructing and testing designs. For example, administrator 104 may execute service design tool 234 to open the project, load the designs and example network instances, and use the tool to test the design.

Administrator 104 may use service design tool 234 to open a project and test a service design in conjunction with a network design to ensure example service orders are placed properly and network resources are allocated as expected. Subsequent to placement design, administrator 104 may add insights playbooks and active assurance monitoring artifacts to the design project to test and monitor running instances of the service.

Administrator 104 may be responsible for activating and modifying network and service designs determined by placement computation engine 214. For example, administrator 104 may upload the network design and upload the service design (e.g., an instance of a network service model and an instance of a customer service model) with a design project as an input, both of which may call design interface 236 to activate the designs in a running placement service.

Web user interface 238 may be configured to provide a web-based interface which may include graphical user interface components, text-based components or the like for facilitating administrator 104 to interact with placement computation engine 214 via the Internet. In some examples, web user interface 238 may use place interface 250 to update service instances under construction in work orders, to test the feasibility of a placement, and report to administrator 104 on the remaining available options for the customer requirements or constraints the work orders contain.

Placement computation engine 214 may also include network resource interface 254, which may be configured to update network resource pools, for example, when a work order includes an instance of a network resource model.

In some examples, computing device 200 may include order manager 248. Order manager 248 may orchestrate the construction and execution of work orders (such as service instances) to prepare for and provide network services. Work orders may flow through a control graph of work items that computing device 200 may process with the work order which may include receiving input from and providing output to storage 242. In some examples, computing device 200 may include a workflow manager interface on Argo that supports starting and monitoring the execution of workflows.

In some examples, computing device 200 is a cloud computing device and placement element 212 is a stateful component running in a highly available cloud environment. As such, in some examples, computing device 200 may include health check interface 222 configured to check the health of a placement element and to facilitate selecting a leader as the cloud environment may manage scaling by creating placement element replicas and deleting unhealthy placement elements.

Placement element 212 may satisfy other observability requirements as a client of the Trace, Metrics, and Logs services available in the cloud deployment environment. In some examples, placement is a Cloud Microservice software development kit (SDK) application and as such implements its Trace, Metrics, Logs, Configuration and other services via the SDK's framework.

The designer may add service design elements to the design project, including CSMs, NSMs, transformation templates, and service order examples for testing purposes. For placement service design in particular, the designer may add the selectors and transformers required to adapt placement to the NMs, CSM, and NSM being used.

In some examples, placement computation engine 214 includes an artificial intelligence (AI) algorithm 252 which may be trained to generate efficient placements of customer services on network resources. For example, AI algorithm 252 may receive evaluation criteria (for example, from network controller 100 of FIG. 1) and automatically propose ways to place services to optimize the evaluation criteria. For example, it may not be possible to satisfy all customer requirements and constraints, but it may be acceptable to satisfy most of them. AI algorithm 252 may determine placement of services to optimize the evaluation criteria. In another example, it may be necessary to move some services around to free resources for new services that have more specific requirements, at some risk of disruption to the services being moved. AI algorithm 252 may determine movements of services that may minimize disruption. In some examples, AI algorithm 252 may be a constraint-based branch and bound optimization algorithm. AI algorithm 252 may be trained on expensive to compute, good test examples so as to increase and/or speed up performance on new placement requests.

Figure 3:
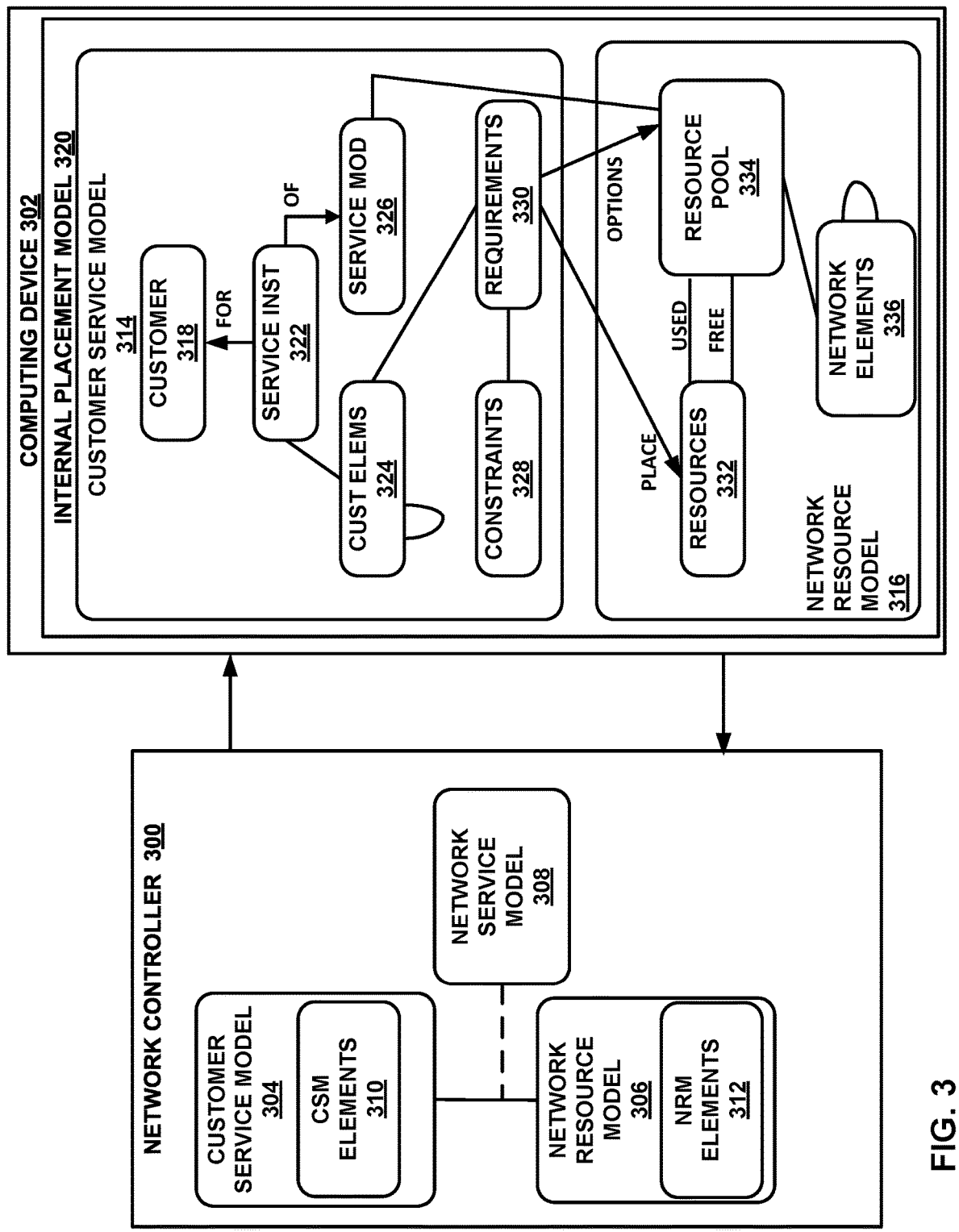
FIG. 3 is a conceptual diagram illustrating an example mapping and inverse mapping according to the techniques of this disclosure.

FIG. 3 is a conceptual diagram illustrating an example mapping and inverse mapping according to the techniques of this disclosure. FIG. 3 may represent example classes used for mapping and inverse mapping. Network controller 300 may be an example of network controller 100 of FIG. 1. Network controller 300 may include customer service model 304, network resource model 306, and network service model 308. Customer service model 304 may be a representation of customer services used by the customer running network controller 300. Customer service model 304 may include customer service model elements 310 which may include objects representative of requirements and/or constraints for customer services. Network resource model 306 may be a representation of network resources of the network which network controller 300 may be managing. Network resource model 306 may include network resource model elements 312 which may include objects representative of available resources in the network of the customer. Network service model 308 may be a representation of already placed customer services on network resources. Administrator 104 (FIG. 1) may transmit instances of customer service model 304, and a resource model representative of resources, such as network service model 308, and/or network resource model 306, to computing device 302 for computing device 302 to place customer services associated with customer service model 304 on network resources associated with network resource model 306 or network services model 308 in view of requirements and constraints associated with the customer services.

Computing device 302 may map instances of customer service model 304, network resource model 306, and/or network service model 308 into internal placement model 320. Internal placement model 320 may be an example of internal placement model 220 of FIG. 2. Customer service model 304, network resource model 306, and network service model 308 may be customized models used by the customer operating network controller 300. Internal placement model 320 may include customer service model 314 and network resource model 316 that may be represented differently than customer service model 304 and network service model 306 of network controller 300. For example, customer service model 314 may identify a customer 318 (e.g., the customer operating network controller 300) for which service instance 322 of service model 326 is running. Customer service model 314 may include customer elements 324 which may have requirements 330. These requirements 330 may also include or be associated with constraints 328 that may need to be satisfied in order to provide the desired customer services.

Network resource model 316 may include resources 332 of resource pool 334. Each of resources 332 may be used or may be free. When computing device 302 places one of resources 332 to satisfy a requirement of requirements 330 or a constraint of constraints 328, the resource may be said to be used. Unused resources may be said to be free. Some resources of network resource model 316 may be network elements 336, such as routers, switches, interfaces, or the like.

For example, customer elements may represent service objects representative of a plurality of customer services. In some examples, each customer service of the plurality of customer services is associated with at least one requirement and at least one constraint. In some examples, requirements 330 may include an interface type, a bandwidth, a number of routes, or a maximum cost. In some examples, constraints 328 may include a same point of presence, different points of presence, a same network device, or different network devices. In some examples, the plurality of network resources may include an interface having an interface type, a link, a bandwidth associated with the link, a route, a region, a point of presence, a route distinguisher, a route target, an address, a prefix, or a network device.

In some examples, computing device 302 may automatically allocate, using internal placement model 402, the plurality of resources 332 to the plurality of customer services such that the allocation of the plurality of resources satisfies the at least one requirement (of requirements 330) and the at least one constraint (of constraints 328) of each of the plurality of customer services. Computing device 302 may then generate data indicating the allocation of the plurality of resources 332 to the plurality of customer services and inverse map the data indicating the allocation to a format consumable by network controller 300 and transmit the inverse mapped data to network controller 300. For example, computing device 302 may inverse map the data indicating the allocation into a network service model instance containing information indicating the allocation. Computing device 302 may output the inverse mapped data to customer device 400. In this manner, customer device 400 may receive information enabling customer device 400 to provision the plurality of customer services on the resources of the network 120 (FIG. 1).

In some examples, rather than allocating the plurality of resources to satisfy all of the constraints of the plurality of customer services, computing device 302 may automatically determine, for each requirement (e.g., of requirements 330) and for each constraint (e.g., of constraints 328), whether the requirement or constraint can only be satisfied by a particular resource of the plurality of resources 332. For example, a requirement for a customer service may be that a link is 50 GB and there may be only one 50 GB link with all the other links being less than 50 GB. Thus, the particular requirement of a 50 GB link may only be satisfied by the one 50 GB link. Computing device 302 may allocate, in response to the determination, at least one of the plurality of resources 332 to at least one customer service of the plurality of customer services based on the determination. For example, computing device 302 may allocate the 50 GB link to the customer service having the 50 GB link constraint. Computing device 302 may provide to customer device 400, subsequent to the determination for every requirement of requirements 330 and for every constraint of constraints 328, information to enable customer device 400 to provision the at least one customer service (e.g., the customer service having the 50 GB restriction).

By mapping a customer service instance, a network service instance, and/or a network resource instance into the internal placement model, computing device 200 may be able to determine the placement of customer services on network resources for any network, not just network 120. By mapping a resulting placement back into a network service instance that is consumable by network controller 100, network controller 100 may have all information necessary to provision the network resources of network 120 (FIG. 1). Thus, the techniques of this disclosure provide a practical application of technology through the transformation of data received by computing device 200.

Figure 4:
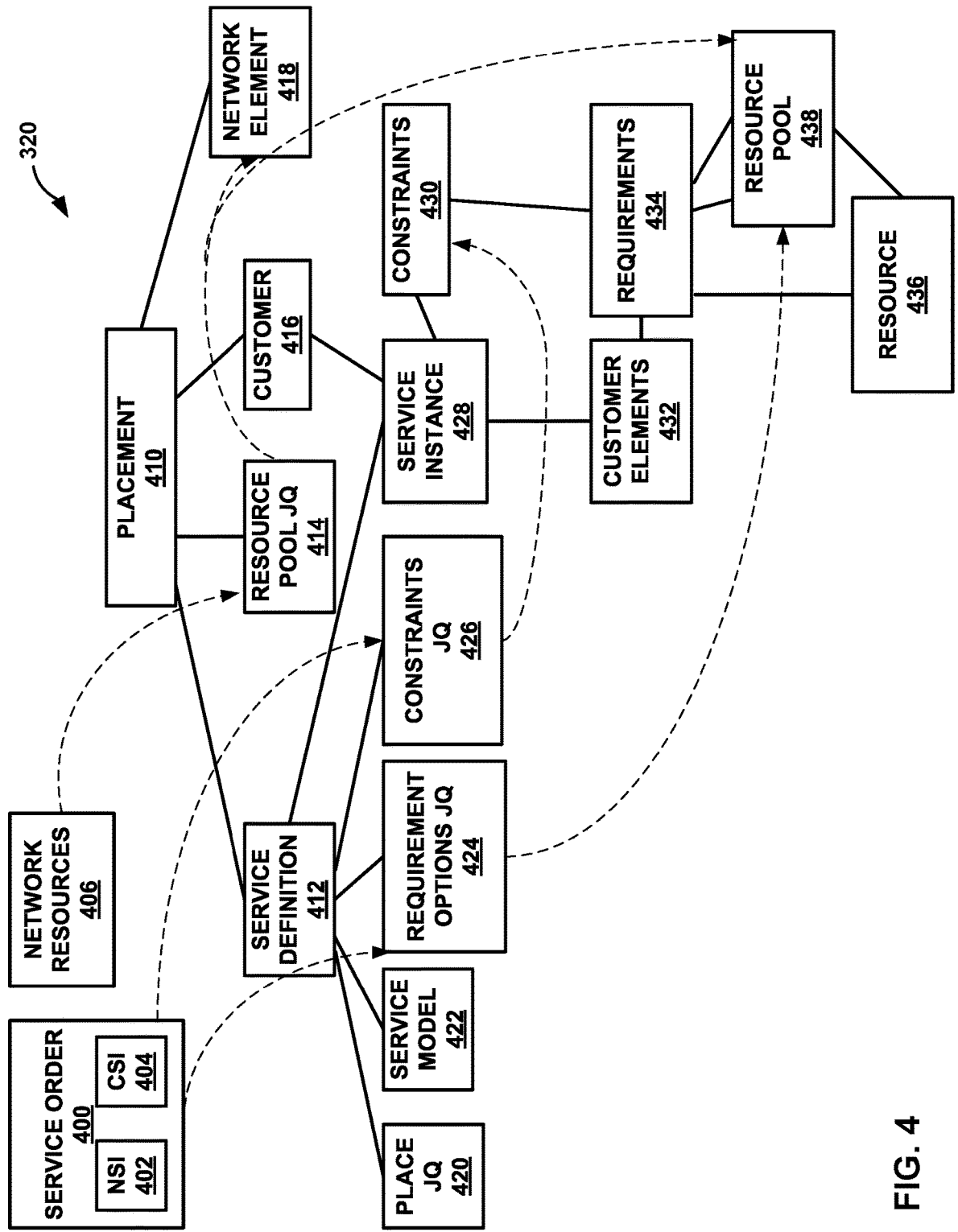
FIG. 4 is a conceptual diagram illustrating the internal placement model according to the techniques of this disclosure.

FIG. 4 is a conceptual diagram illustrating the internal placement model 320 according to the techniques of this disclosure. FIG. 4 may represent example classes of internal placement model 320. Dashed lines may represent mappings which computing device 302 (FIG. 3) may perform. For example, computing device 302 may receive a service order 400 from a customer. Service order 400 may include a network service instance 402 and a customer service instance 404. In some examples, service order 400 may include a network resource instance which may include a representation of network resources 406. Computing device 302 may use service order 400 and any prior knowledge of network resources 406 to map the customer services and network resources into the internal placement model 320. For example, network device 302 may map elements of service order 400 into requirement options JQ 424 and constraints JQ 426 (both described hereinafter). Network device 406 may map elements of network resources 406 to resource pool JQ 414 (described hereinafter).

Elements of internal placement model 320 may include service definition 412 which may be used to represent a definition of a service, resource pool JQ 414 which may be used to manage a resource pool, such as resource pool 438, for example using a JavaScript Object Notation (JSON)

query (JQ) language. JSON is a standard text-based format for representing structured data based on JavaScript object syntax. For example, a JQ may be a general-purpose transformer for JSON documents similar to XPATH and XSLT (Extensible Stylesheet Language Transformations) for XML (extensible markup language). While examples set forth in this disclosure may refer to the use of JQ language, any programming language may be used according to the techniques of this disclosure, such as Python, C++, Go, or other suitable programming language.

Internal placement model 320 may also include customer 416 which may identify the customer who submitted service order 400, and network element 418 which may represent or identify various network elements of network resources 406.

Service definition 412 may interact with place JQ 420. Place JQ 420 may accept as an input an object with a "order" attribute containing the service order with the input instance and a "place" attribute containing a list of requirements as described above updated with option lists and placement results in the same form as input option restrictions and manual placement. A place JQ may output an update to the JSON document in the "order" attribute to reflect the options updates resulting from propagation of constraints and placement allocations if the service was placed.

There can be more than one place JQ. The "order" input of a subsequent place JQ may be the output of the preceding place JQ.

Service definition 412 may also interact with service model 422 which may be an example of customer service model 314 of FIG. 3, and requirements options JQ 424 which identifies the requirements in a service instance and what options there are for placing the requirements on network resources of resource pool 438, for example. Constraints JQ 426 identifies constraints, such as constraints 430, which must be satisfied based on combinations of requirements. Service instance 428 which may represent an instance of a customer service.

Service instance 428 may be an instance of service order 400 and be associated with constraints 430 and customer elements 432. Constraint 428 may be associated with requirements 434. Requirements 434 may be associated with resource 436 which may be a resource represented in resource pool 438. Resource pool 438 may include used and free resources. When computing device 302 places a service on resource 436, the resource 436 may be updated in internal placement model 320 to indicate that resource 436 is used.

By representing customer service models and network service models in internal placement model 320, computing device 302 may generate placements of customer services on network resources for many different customers, even though the many different customers may be using different customer service models and/or network resource models within their own network devices.

In some examples, basic constraints, such as constraints 430, must also be satisfied by a valid placement. One such constraint may include that the interface must be on a node in the same location as the customer site. Another such constraint may be that the bandwidth needed for the access must be allocated from the node where the access was placed. Another such constraint may be that the number of routes for the site must be allocated from the node where the access is placed. Further, virtual private networks (VPNs) may also have diversity constraints for robustness in case of failure, which may require that two or more accesses be placed on different nodes.

Example service placement use cases are now discussed. Design management may include the following aspects: network design and service design. Network design may be the process of specifying how to select the network resource pools from input network service instance 402. Service design may be the process of specifying how to select the requirements, valid network options, and constraints from input customer service instance 404. Service design may also be the process of specifying how to determine the manually provided placement restrictions from input network service instance 402. Service design may also be the process of specifying how to update network service instance 402 and customer service instance 404 with the result of validating/narrowing options and automatically placing a service.

In some examples, network resource pools, such as network resource pool 438, may be shared among all the services for which they are relevant. In this manner, service design activation often does not require any changes to the network design. In case a service design depends on a network resource not in the current network design, the network design may be updated as part of the service design activation.

There are several other non-placement aspects to service activation, such as activating associated workflows. Placement 410 is used for pre-provisioning and service provisioning workflows. Pre-provisioning is the process of discovering and preparing new network resources to support services. Placement 410 may determine the network design on the new or updated network to maintain the resource pools available for allocation to services. Service provisioning may include composing a service order and collecting the customer requirements in CSI 404 for service order 400.

In the service order composition process, placement 410 may be called, any time an order is in a consistent state, to semantically validate the order and provide the valid options to consider for all requirements. For example, at any time in the order composition process, web user interface 238 of FIG. 2 may send the service order for an update of the instance the service order contains. Placement 410 may update the instance by propagating the constraints and allocating any resources that are requested as manual placements by administrator 104. Propagating constraints may include determining the remaining set of options for a requirement.

The options can be narrowed down via administrator 104 input, for example administrator 104 may request that an access be placed on a point of presence in New York City even though the service design would allow placement on a point of presence in New York City and Connecticut. A manual placement is a very specific narrowing of the options, indicating the exact PE interface on which an access is to be placed.

Propagating constraints can determine option reductions triggered by administrator 104 inputs such as manual placement decisions. For example, if administrator 104 manually places on access in a PE NYC1 and has another access requirement with a point of presence diversity constraint, all options involving PE NYC1 can be removed from the second access.

Another way constraint propagation can reduce options is as the service order gets more elaborate. As requirements and constraints are added to the service order, the set of options for earlier specified requirements can be eliminated. Another way constraint propagation can reduce options is due to concurrently processed orders allocating resources which may make certain options no longer available.

Order composition may be an interactive process with placement 410 helping to narrow down the available options that populate pick lists for manual placement and/or indicating that the requirements are not satisfiable so the operator can consult with the customer or order more network resources to compose an order that satisfies all constraints.

Placement 410 has a role at execution time. The service provisioning workflow starts by executing the placement of a service order to automatically complete the service placement if the service placement was not fully manually placed and allocating resources before updating the order with network service instance 402 needed for subsequent steps in the workflow including transformation and application to devices.

Model based placement designs may be specified in terms of filter programs that, informed by a model, transform model instances to an internal placement model and vice versa. For example, computing device 302 (FIG. 3) may transform input instances to placement elements such as resource pools, requirements, constraints, and relationships between these elements. Placed instances may be in turn transformed back into updated instances of the models in use.

Placement 410 may define schema for placement elements and selectors for the three selector types defined SDs. For example, a JQ filter may transform network resources to index by their network element identity (point of presence/PE/interface type), location, and type.

A network design may consist of a model and a set of network resource pool JQ 414 filters. The resource pool JQ 414 filters identify the network resource pools in the instances of the network model on which the resource pool JQ 414 filters are run.

An example network model may include a set of points of presence with locations containing PEs with bandwidth and route resources. Each PE may be composed of a set of interfaces categorized by the type of service they can provide (leased line, DSL, etc).

For example, resource pool JQ 414 may take an instance of the network model in use and output paths in the network element "forest" leading to resource pools. There can be any number of resource pool JQs developed to construct different parts of the resource pool forest. In other examples, rather than a network element forest, which may effectively include a hierarchical database with one index, internal placement model 320 may be organized in another fashion, such as including one or more relational databased, graph databases, or the like.

Following is the model for the output of resource pool JQ 414. A resource pool includes a network element path. The network element path may be a sequence of name: type pairs, each type being an attribute of the network element at the end of the path and the name being the value of that attribute. The paths serve to organize and index the network elements into a hierarchical database supporting queries for valid requirement options.

A service design may include requirements, options, constraints, and place JQ filters. If the requirement is manually placed in the instance, the requirement JQ may indicate this with a pool path in the network element forest. In the case of a named or numbered resource, the specific name or number of the resource may be indicated in a named requirement or a numbered requirement, respectively Placement JQs work in the opposite direction compared to requirement options and constraint JQs: they take as input the placement elements for a placed service and update network service instance 402 and/or customer service instance 404 in service order 400 with the result of the placement update.

Figure 5B:
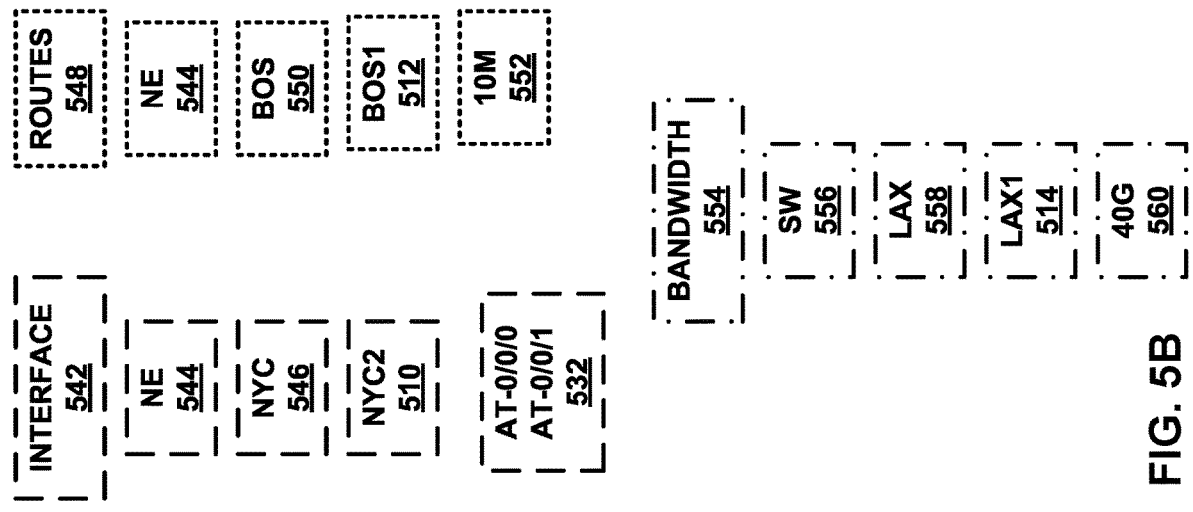
FIGS. 5A-5B are conceptual diagrams illustrating examples of a plurality of resources and example placements of some of the plurality of resources.
Figure 5A:
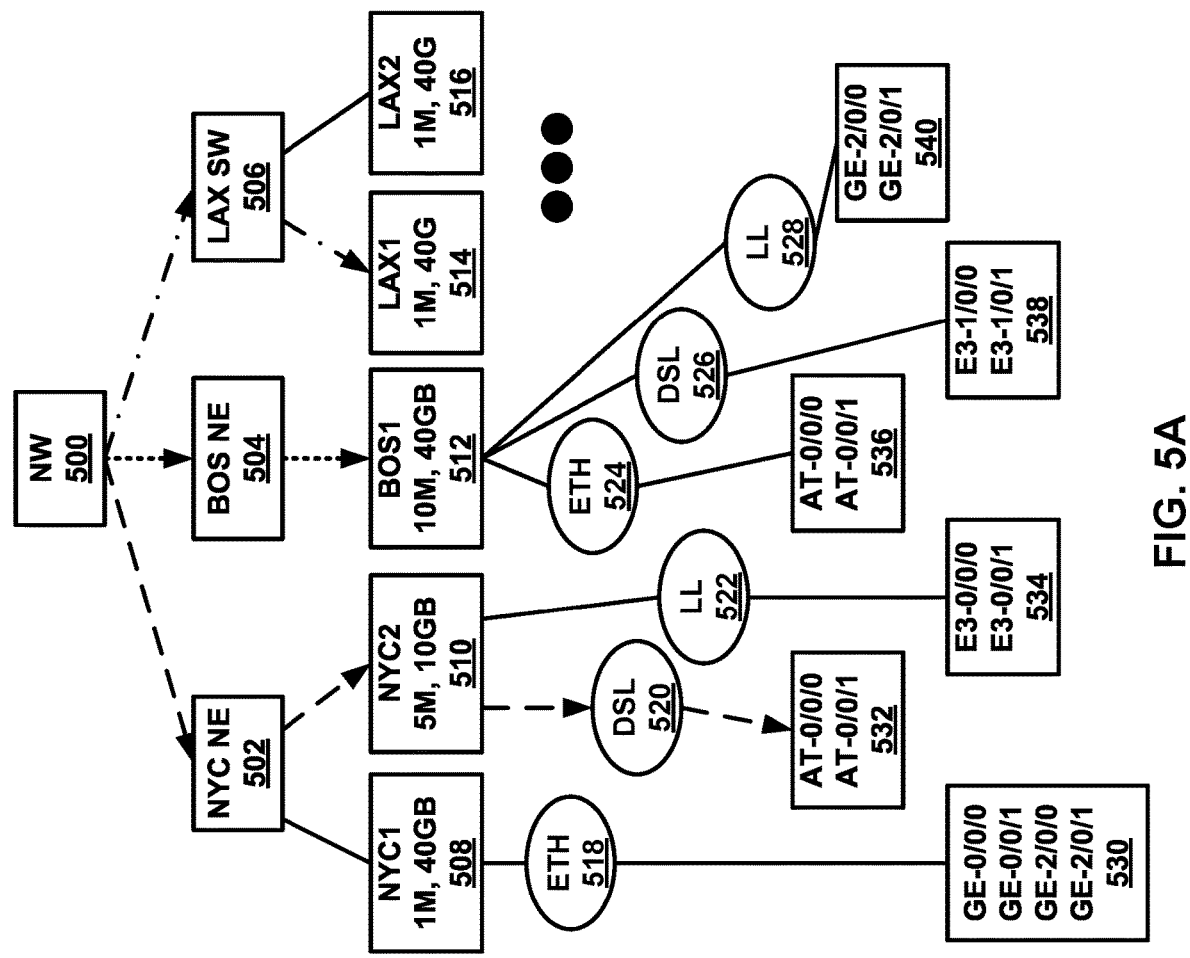

FIGS. 5A-5B are conceptual diagrams illustrating examples of a plurality of resources and example placements of some of the plurality of resources. FIGS. 5A and 5B may represent example objects (or instances of classes) classes used for placement. As shown in FIG. 5A, resources may include a region, such as Northwest (NW 500). Resources may also include a location, such as New York City in the Northeast (NYC NE 502), Boston in the Northeast (BOS NE 504), and Los Angeles in the Southwest (LAX SW 506). The locations may include points of presence, such as NYC1 508, NYC2 510, BOS1 512, LAX1 514, and LAX2 516. Each point of presence may include a number of routes and a bandwidth. For example, NYC1 508 has 1 million routes and 40 GB of bandwidth. Each point of presence may have a pool of associated interface types. For example, NYC1 508 may have ethernet type interface pool (ETH 518), and NYC2 510 may have digital subscriber line type interface pool (DSL 520) and leased line type interface pool (LL 522). Similarly, BOS1 512 may have ETH 524, DSL 526, and LL 528. Each interface type pool may include interfaces of that type. For example, ETH 518 may have ethernet interfaces GE-0/0/0, GE-0/0/1, etc. as shown in box 530, DLS 520 may have DSL interfaces shown in box 532, LL 522 may have leased line interfaces shown in box 534, ETH 524 may have ethernet interfaces shown in box 536, DSL 526 may have DSL interfaces shown in box 538, and LL 528 may have leased line interfaces shown in box 540.

In some examples, resource allocation or placement may be based, at least in part, on satisfying requirements of a given customer service. For example, as shown in FIG. 5B, a first service may have a specific interface represented by interface 542 that may be satisfied when computing device 302 makes a placement of the customer service on the resources of FIG. 5A. In this example, the interface may be interface 532. Thus, when placing this example customer service, computing device 302 may identify interface 532 as a DSL interface. As interface 532 is of interface type DSL 520, in point of presence NYC2 510 in New York City, in the Northeast, computing device 302 may place the customer service as illustrated by the dashed line in FIG. 5A and as summarized in FIG. 5B by the dashed boxes (e.g., interface 542, NE 544, NYC 546, NYC2 510, and interface 532).

In another example, a customer service may have a particular number of supportable routes that is a requirement, for example, as represented by routes 548. When placing this example customer service, computing device 302 may identify a resource having at least the required number of supportable routes to place the service. If the number of routes is 10 million, computing device 302 may place the customer service as shown by the dotted lines in FIG. 5A. For example, computing device 302 may place the service from the Northwest region (NW 500), to the Boston location, BOS 504, to BOS1 512 point of presence. This example is also shown in FIG. 5B with the matching dotted lines (e.g., routes 548, NE 544, BOS 550, BOS1 512, and 10M routes 552).

In another example, a customer service may have a bandwidth requirement, for example 40 GB. In this example, computing device 302 may place the customer service on the resources of FIG. 5A to satisfy the bandwidth requirement. For example, computing device 302 may determine that LAX1 has a free 40 GB of bandwidth and place the service as indicated in the alternating dashed/dotted lines in FIG. 5A. This example is also represented by the similar lined boxes in FIG. 5B (bandwidth 554, SW 556, LAX 558, LAX1 514, and 40G 560).

In these examples, of FIGS. 5A-5B, each example involved the placement of a single customer service with a single requirement (interface, routes, or bandwidth). As the number of requirements for each customer service grows, additional constraints are placed on the customer services, a higher number of customer services is added, more resources are added, and placement of customer services on such resources starts to use up the resources, determining how best to allocate the resources to the customer services becomes much more complicated.

Resource pool JQs may trace paths in the input instance and construct name:type paths of network elements leading to resource pools in the placement element model.

Figure 6:
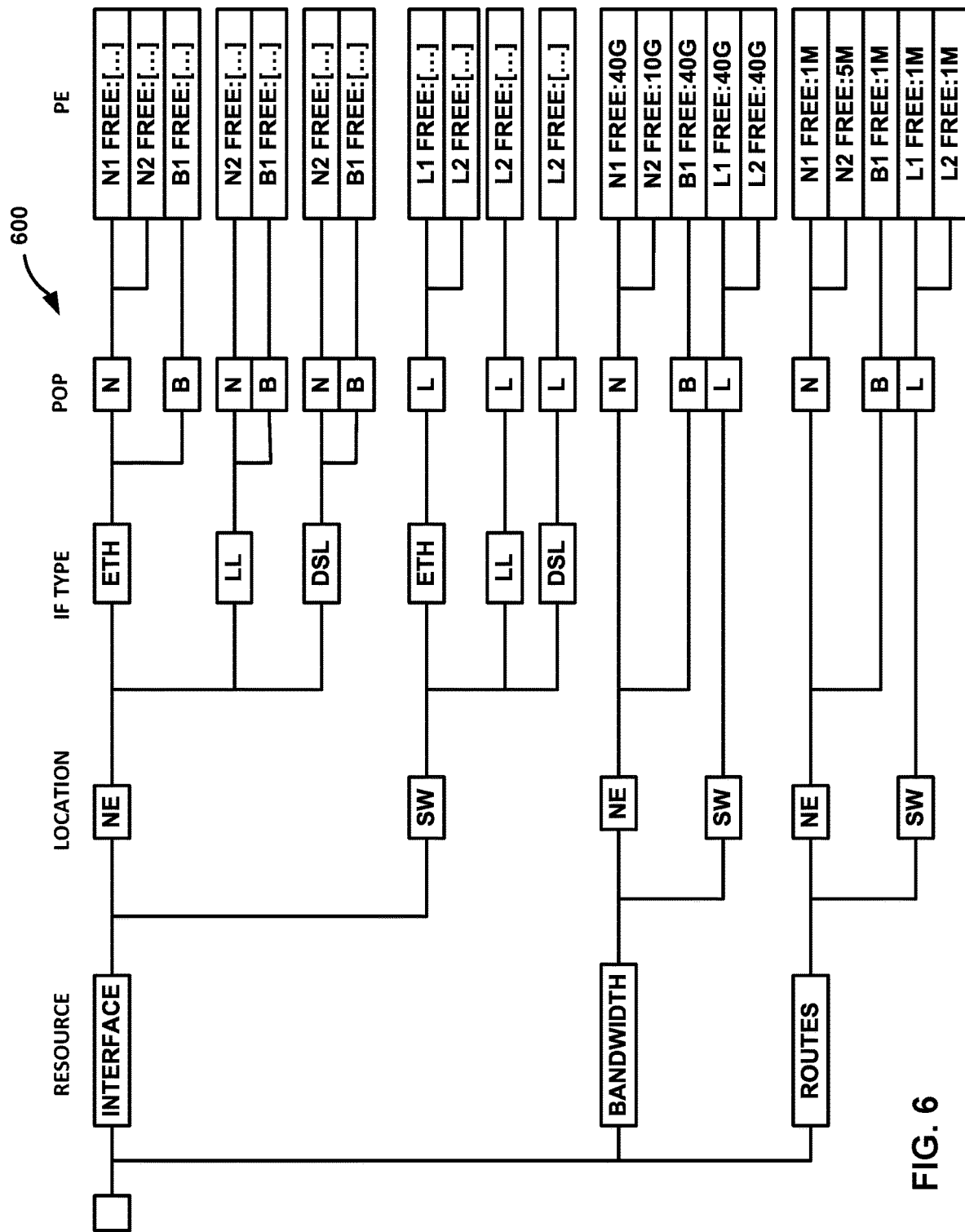
FIG. 6 is a conceptual diagram depicting an example resource tree for a resource pool according to the techniques of this disclosure.

FIG. 6 is a conceptual diagram depicting an example resource tree for a resource pool according to the techniques of this disclosure. FIG. 6 may represent example objects (or instances of classes) used for placement. Resource tree 600 includes three types of resources: interfaces, bandwidth, and routes. Each of the interfaces, bandwidths and routes of resource tree 600 may include a location, such as Northeast (NE) or Southwest (SW). The interfaces may also have an associated interface type, such as ethernet, LL or DSL. Each of the interfaces, bandwidths, and routes may have an associated point of presence, such as New York City (N), Boston (B), or Los Angeles (L). Each of the interfaces, bandwidths, and routes may have an associated point of presence such as NYC1 (N1), NYC2 (N2), BOS1 (B1), LAX1 (L1), and LAX2 (L2). In this example, the interfaces, bandwidths, and numbers of routes are shown in the associated points of presence as free. This means none of these resources has been allocated by placing a customer service on the resource.

Running all the resource pool JQs, such as resource pool JQ 414 of FIG. 4, allows placement 410 to construct a "forest" of network elements with each path in the forest leading to resource pools which placement 410 allocates to requirements in service instances, like this.

Figure 7:
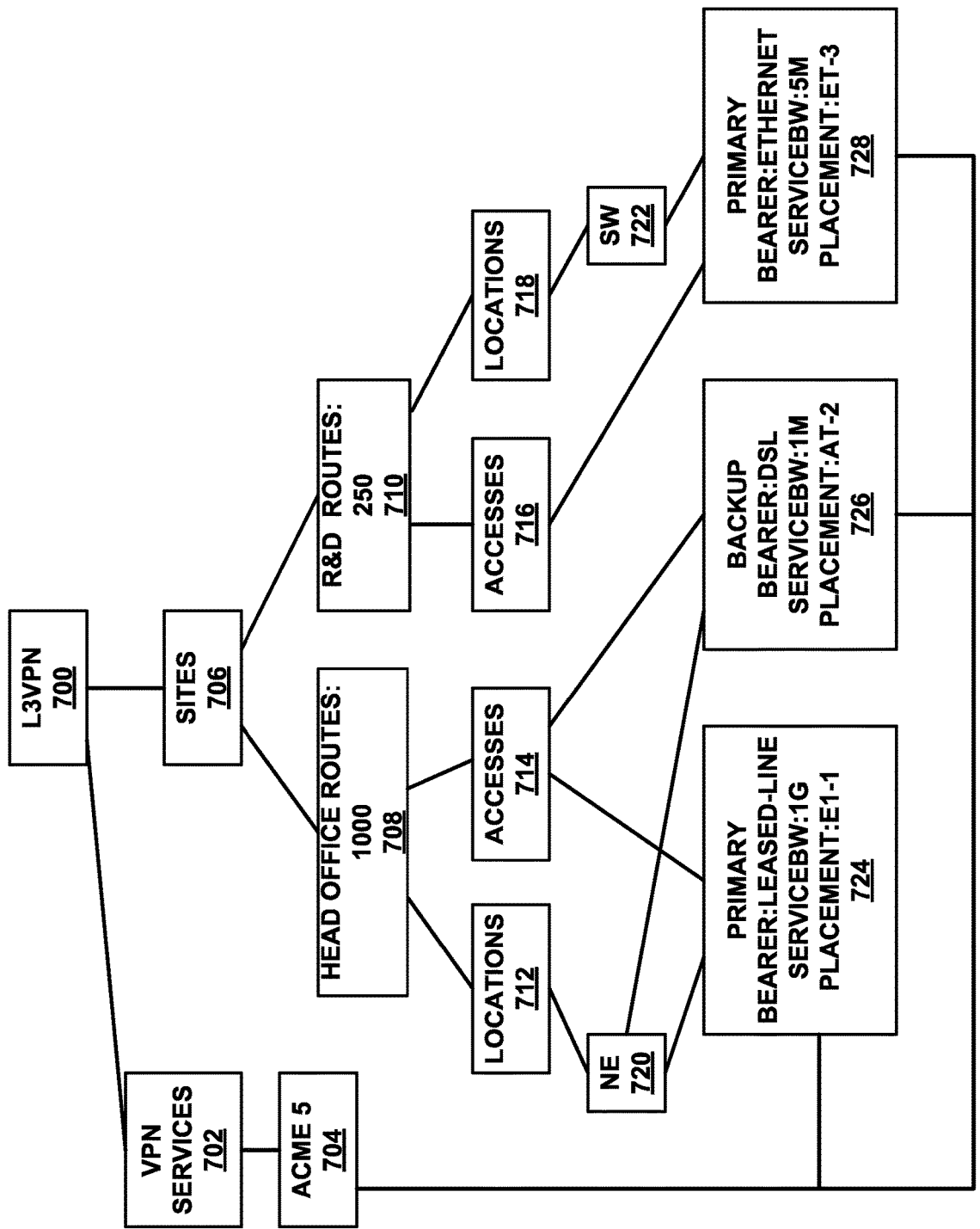
FIG. 7 is a conceptual diagram depicting an Layer 3 virtual private network (L3VPN) service order instance according to the techniques of this disclosure.

FIG. 7 is a conceptual diagram depicting a Layer 3 virtual private network (L3VPN) service order instance according to the techniques of this disclosure. FIG. 7 may represent example classes used with a service order instance. For example, a customer (ACME 5) may place L3VPN service order instance for an L3VPN service 700 by transmitting the service order instance to computing device 302. Computing device 302 may map the service order instance into internal placement model 320. For example, computing device 302 may determine L3VPN service 700 is one of VPN services 702 and is for customer ACME 5 704. Computing device 302 may determine that there are sites 706 involved in this L3VPN service order instance.

Each of these sites may have route requirements. For example, a requirement for a number of supportable head office routes 708 may be one thousand routes and a requirement for a number of supportable research and design (R&D) routes 710 may be two-hundred-fifty routes. Head office routes 708 may include location requirements 712 (such as being in NE 720) and access requirements 714, such as 1 GB of bandwidth for a primary placement and 1 MB of bandwidth for a backup placement. R&D routes 710 may include access 716 and location requirements 718. For example, location requirement 718 may be of SW 722 and access requirement 716 may be 5 MB of bandwidth.

Computing device 302 may base the placement of the L3VPN customer service on the various requirements and constraints of the L3VPN service order instance. For example, computing device 302 may determine to place the primary head office routes at a location of NE 720 with a bearer being leased line, a bandwidth of 1 GB and a placement at E1-1 as indicated in box 724. Computing device 302 may determine to place the backup head office routes at a location of NE 720, with a bearer of DSL, a bandwidth of 1 MB and a placement at A-2 as shown in box 726. Computing device 302 may also determine to place the R&D routes at a location of SW 722 with a bearer being ethernet, bandwidth of 5 MB and placement at ET-3 as shown in box 728. This is a fairly simple example with two offices, a few requirements, and two constraints. A real-life example may be extremely complicated. While the example of FIG. 7 is directed to an L3VPN, in some examples, a service order instance may be a Layer 2 virtual private network (L2VPN), or any network service.

Figure 8:
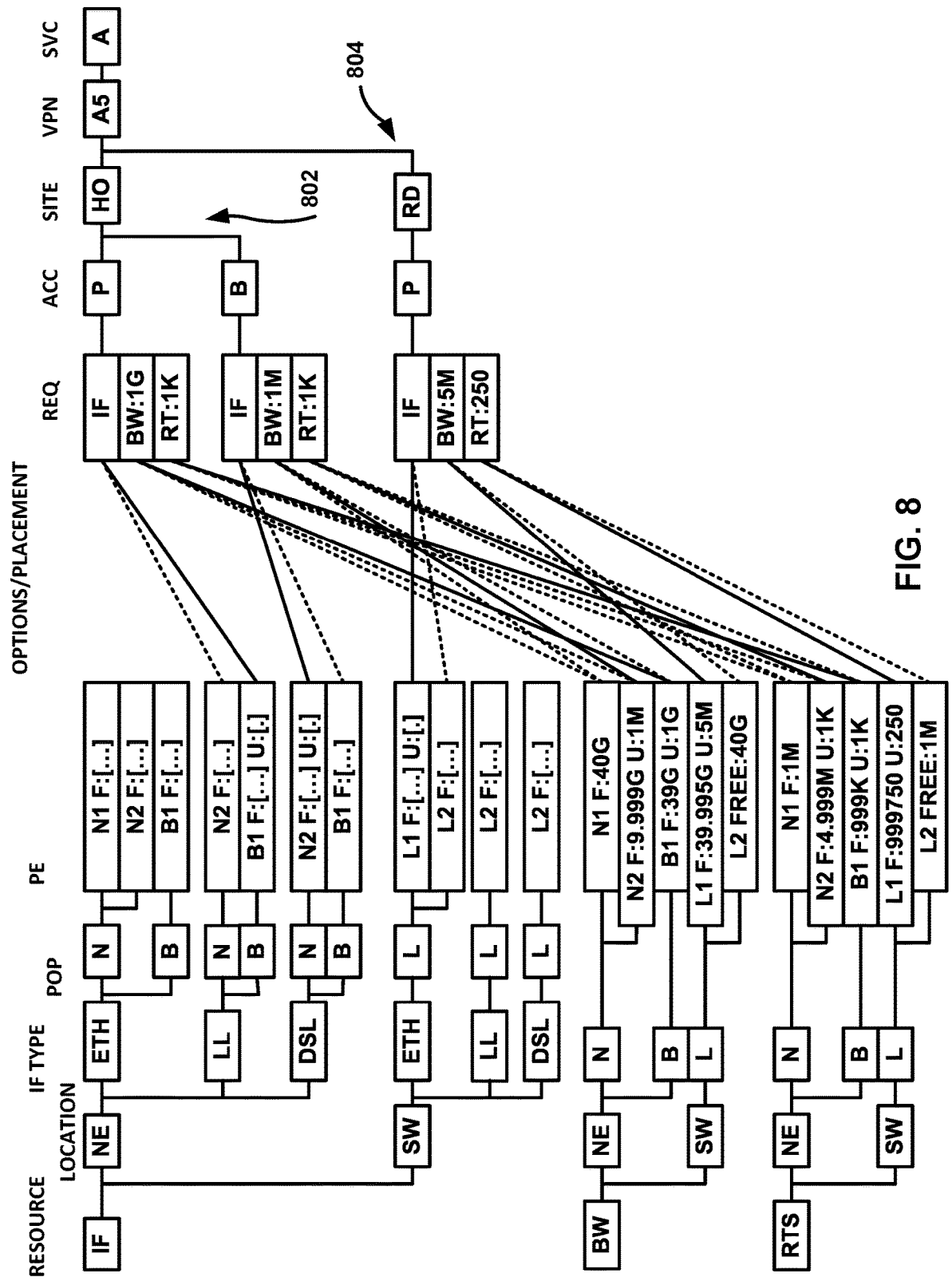
FIG. 8 is a conceptual diagram illustrating options of placement and placed resources according to the techniques of this disclosure.

FIG. 8 is a conceptual diagram illustrating options of placement and placed resources according to the techniques of this disclosure. FIG. 8 may represent example objects (or instances of classes) used for placement. In the example of FIG. 8, the previously unallocated resources of the example of FIG. 7 are shown. The customer services from the examples of FIG. 7 are also shown. For example, customer service 802, for the home office (HO), may have a constraint that two points of presence be used and have requirements that one point of presence have 1 GB of bandwidth and 1 K routes and the other point of presence have 1 MB of bandwidth and 1 K routes. Customer service 804, for the R&D facility, may have a constraint that the same PE be used and have requirements of 5M of bandwidth and 250 routes.

Computing device 302 may determine which of the options for allocation are optimal and allocate such options. Each of the dotted lines represents a potential allocation that was not made and each of the solid lines represents an allocation that is made. Computing device 302 may update the free and used statistics associated with each of the allocated resources to reflect the new allocations. In the example, of FIG. 8, the F represents "free" and U represents "used."

Figure 9:
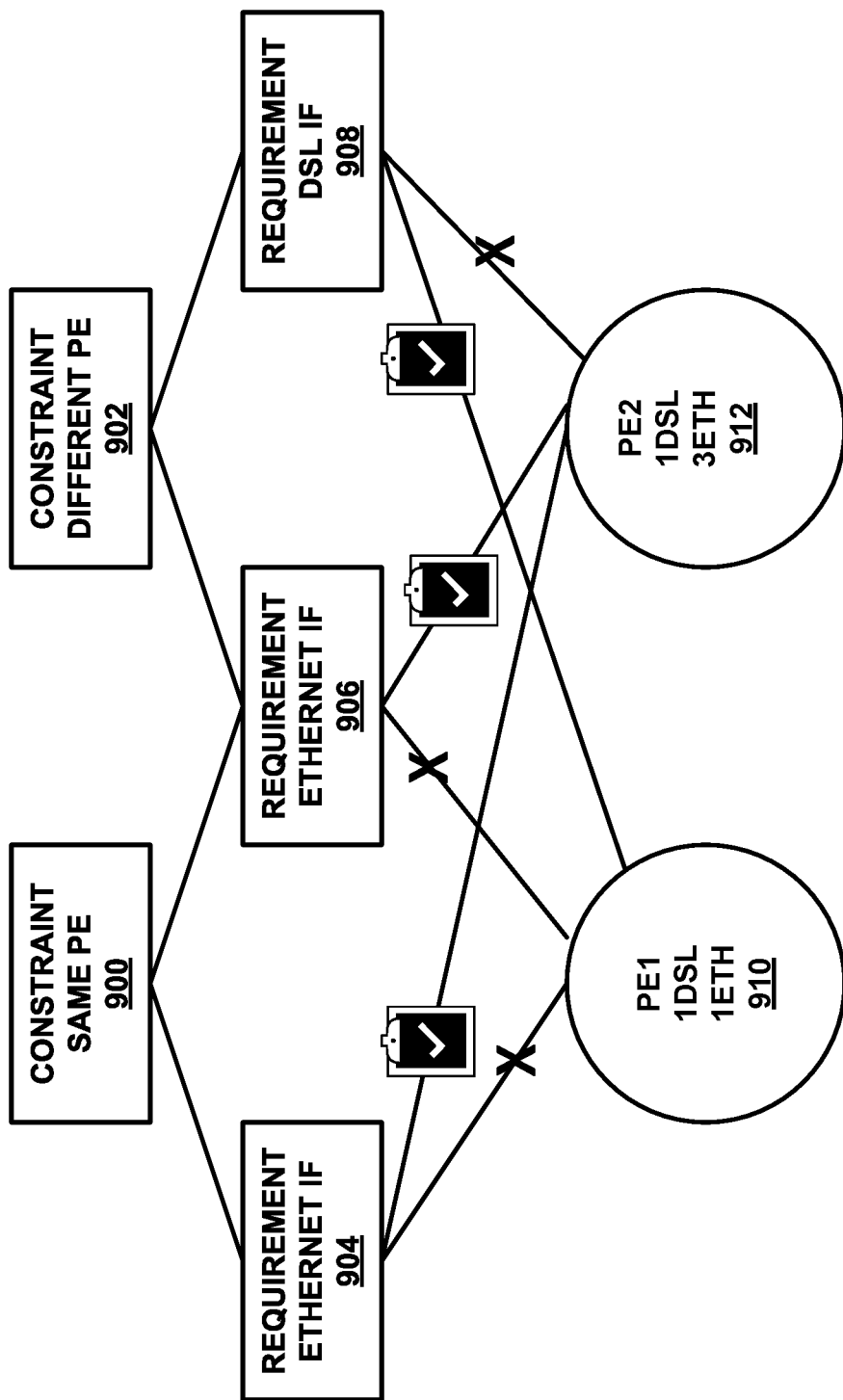
FIG. 9 is a conceptual diagram depicting an example allocation of resources to customer services to satisfy associated constraints.
Figure 10:
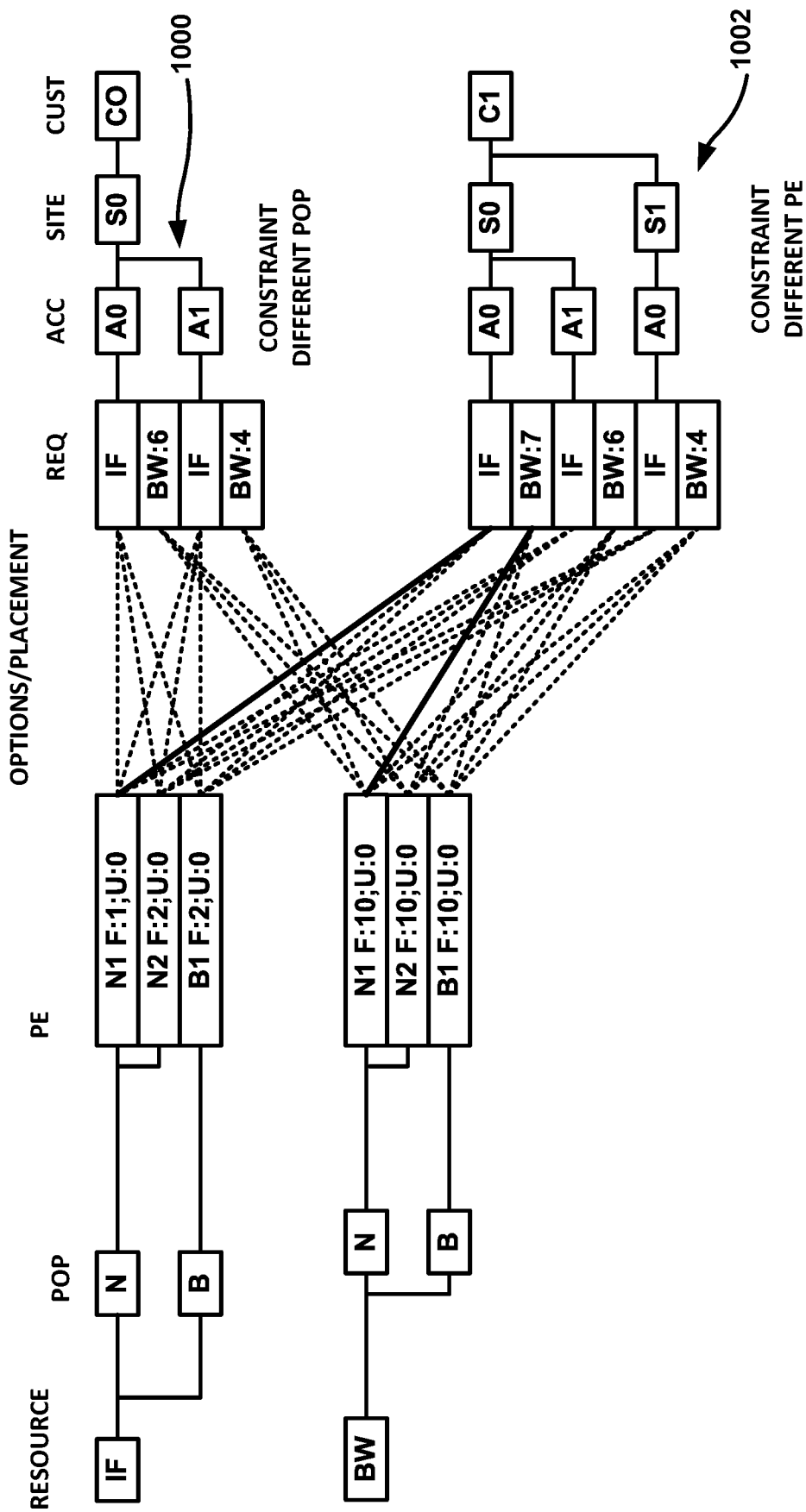
FIG. 10 is a conceptual diagram illustrating example placement assistance techniques according to this disclosure.

FIG. 9 is a conceptual diagram depicting an example allocation of resources to customer services to satisfy associated constraints. In the example of FIG. 10, at least one customer service has a constraint 900 that the resource used for the customer service be on a same PE. The at least one customer service has a constraint 902 that the resources used for the customer service be on different PEs. The at least one customer service has a requirement for two ethernet interfaces, requirement 904 and requirement 906 and a DSL interface, requirement 908.

PE1 910 may have a single DSL interface and a single ethernet interface available. As such, to satisfy requirement 904, requirement 906, and constraint 900, the ethernet resources (two ethernet interfaces on a same PE), the resources of PE2 912 must be allocated to requirement 904 and requirement 906, which include one DSL interface and three ethernet interfaces.

To satisfy constraint 902, that requirement 908 be placed on a different PE than requirement 906, the DSL interface of PE1 must be allocated to requirement 908. Again, this is a simple example with two constraints and three requirements. Allocating network resources in real world examples of networks with thousands of resources, thousands of customer services having thousands of constraints and thousands of requirements becomes incredibly unwieldy.

FIG. 10 is a conceptual diagram illustrating example placement assistance techniques according to this disclosure. FIG. 10 may represent example objects (or instances of classes) used for placement. In the example of FIG. 10, customer service 1000 and customer service 1002 are shown. Two allocations, (examples are shown in bold lines), must be made in order to satisfy the constraints associated with the customer services. Each of the dotted lines shown under options/placement are options and need not be applied in order to satisfy the constraints. In other words, if an allocation, such as the ones represented by the bold lines, were not made, constraints associated with customer service 1002 could not be satisfied. For example, to satisfy the remaining constraints (once the bold lined placements are made) associated with customer services, there may be multiple options. In other words, each of the remaining constraints may be satisfied by more than one resource.

For example, to satisfy the requirements of customer service 1002 that customer C1 have their interfaces on different PEs, each of the interface requirements of a bandwidth of 7, 6 and 4, must be placed on a different PE of N1, N2, and N3. As shown, CE N1 has 1 free interface, while CE N2 and CE B1 both have two free interfaces. Therefore, the free interface of CE N1 must be allocated to one of the interface requirements of customer service 1002 to meet the associated constraint. As shown, the interface of CE N1 is allocated to the requirement of C1/S0/A0. In other examples, the interface of CE N1 may be allocated to requirement C1/S0/A1 or C1/S1/A0.

In contrast, the requirements and constraint of customer service 1000, do not necessitate any specific resource allocation. The requirements of C0/S0/A0 and C0/S0/A1 are constrained to be on different points of presence. As point of presence N includes free interfaces on both PE N1 and PE N2 and point of presence B includes free interfaces on PE B1, the requirements and constraint of customer service 1000 may be met through allocation of resources of PE N1 or PE N2, and allocation of resources of PE B1.

In some examples, computing device 302 may use a score and determine a placement of the plurality of customer services on the plurality of network resources that maximizes score. Computing device 302 may then output an option of the placement having the maximum score for display to administrator 104 via a display associated with network controller 300. Administrator 104 may opt to select such a configuration or opt not to select the displayed configuration.

In some examples, computing device 302 may facilitate administrator 104 to set priorities for some customer services over other customer services. For example, an administrator could indicate to computing device 302 that a particular service is most important or more important than another particular customer service.

In some examples, computing device 302 may use deductive rules to see if requirements or constraints can be met. In some examples, computing device 302 may use artificial intelligence or interlinear programming. In some examples, computing device 302 may use branch and bound techniques. For example, computing device 302 may determine an initial bound and then check another. In some examples, computing device 302 may operate as a constraint optimizer.

In some examples, in an assisted mode, computing device 302 may indicate that changes in the placement of other customer services are required in order to fulfil the requirements of a customer service that is currently being placed. In some examples, computing device 302 may supports two criteria to automatically choose between multiple placement options. For example, computing device 302 may prefer placement that minimizes disruption when modifying a customer service, such as not changing the placement of existing customer services unless such changes are necessary to accommodate any changed constraints. In another example, when allocating resources computing device 302 may prefer balanced allocation across a plurality of resource pools or alternatively using up a first resource pool before starting to allocate from a second resource pool (e.g., similar to multi-protocol label switching (MPLS) least-fill and most-fill criteria).

In some examples, there may be at least one constraint or at least one requirement associated with a new customer service that cannot be satisfied. In such cases, administrator 104 may ask a customer if it is acceptable to the customer to relax the at least one requirement or the at least one constraint. If that is acceptable to the customer, administrator 104 may, via network controller 300 and/or computing device 302, change the at least one requirement or the at least one constraint associated with the new customer service. If that is not acceptable to the customer, administrator 104 may use computing device 302 to re-allocate the plurality of resources such that the at least one requirement or the at least one constraint associated with the new customer service is met. Alternatively, administrator 104 may assign, via computing device 302, a priority to each of the plurality of customer services and re-allocating the plurality of resources based on the assigned priority of each of the plurality of customer services. As another alternative, administrator 104 may re-allocate, via computing device 302, at least a portion of the plurality of resources based on a predetermined criterion.

Figure 11:
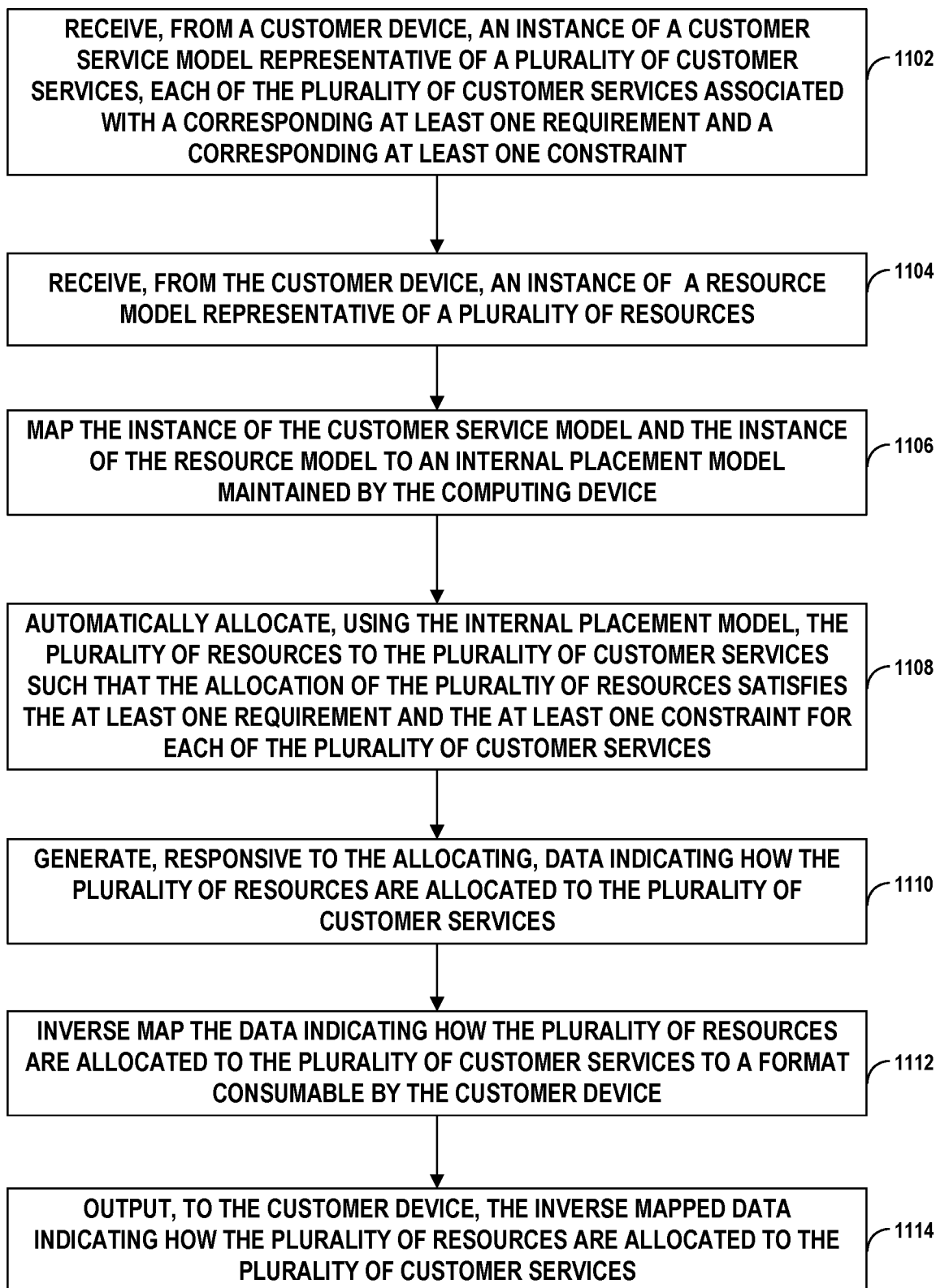
FIG. 11 is a flowchart illustrating example techniques for placing customer services on resources according to this disclosure.

FIG. 11 is a flowchart illustrating operations of example techniques for placing customer services on resources according to this disclosure. Computing device 302 may receive, from a customer device, an instance of a customer service model representative of a plurality of customer services, each of the plurality of customer services associated with a corresponding at least one requirement and a corresponding at least one constraint (1102). For example, computing device 302 may receive, from network controller 300, service order 400 which may include customer service instance 404 (both of FIG. 4).

Computing device 302 may receive, from the customer device, an instance of a resource model representative of a plurality of resources (1104). For example, computing device 302 may receive, from network controller 300, service order 400 which may include network service instance 402 or network resources 505.

Computing device 302 may map the instance of the customer service model and the instance of the resource model to an internal placement model maintained by the computing device (1106). For example, computing device 302 may map the instance of the customer service model and network service instance 402 and/or network resources to internal placement model 320.

Computing device 302 may automatically allocate, using the internal placement model, the plurality of customer services to the plurality of resources such that the allocation of the plurality of resources satisfies the at least one requirement and the at least one constraint for each of the plurality of customer services (1108). For example, computing device 302 may automatically allocate, using internal placement model 320, the plurality of resources to the plurality of customer services such that the allocation of the plurality of resources satisfies the at least one requirement and the at least one constraint for each of the plurality of customer services.

Computing device 302 may generate, responsive to the allocating, data indicating how the plurality of resources are allocated to the plurality of customer services (1110). For example, computing device 302 may generate, data indicating the allocation of the plurality of resources to the plurality of customer services.

Computing device 302 may inverse map the data indicating how the plurality of resources are allocated to the plurality of customer services to a format consumable by the customer device (1112). For example, computing device 302 may map the data indicating the allocation into network service model instance 402 thereby updating network service model instance 402. In the case where service order 400 did not include network service model instance 402, computing device 302 may create network service model instance 402 including the data indicating the allocation.

Computing device 302 may output, to the customer device, the inverse mapped data indicating how the plurality of resources are allocated to the plurality of customer services (1114). For example, computing device 302 may output, to network controller 300, an updated network service model 412 containing inverse mapped data indicating how the plurality of resources are allocated to the plurality of customer services.

In some examples, the customer device is a first customer device, the instance of the customer service model is an instance of a first customer service model, the instance of the resource model is an instance of a first resource model, the plurality of customer services is a first plurality of customer services, and the plurality of resources is a first plurality of resources. In such examples, computing device 302 may receive, from a second customer device (e.g., a different network controller), an instance of a second customer service model representative of a second plurality of customer services, the second plurality of customer services, each of the second plurality of customer services associated with a corresponding at least one requirement and a corresponding at least one constraint, the second customer service model being different than the first customer service model. In such examples, computing device 302 may receive, from the second customer device, an instance of a second resource, the second resource model being different than the first resource model. In such examples, computing device 302 may map the instance of the second customer service model and the instance of the second resource model to the internal placement model. In such examples, computing device 302 may automatically allocate, using the internal placement model, the second plurality of resources to the second plurality of customer services such that the allocation of the second plurality of resources satisfies the at least one requirement and the at least one constraint for each of the second plurality of customer services. In such examples, computing device 302 may generate, responsive to the allocating the second plurality of resources to the second plurality of customer services, data indicating how the second plurality of resources are allocated to the second plurality of customer services. In such examples, computing device 302 may inverse map the data indicating how the second plurality of resources are allocated to the second plurality of resources to a format consumable by the second customer device. In such examples, computing device 302 may output, to the second customer device, the inverse mapped data indicating how the plurality of resources are allocated to the second plurality of customer services.

In some examples, the resource model comprises at least one of a network service model (e.g., network service model 308 of FIG. 3) representative of existing placed customer services on the plurality of resources or a network resource model (e.g., network resource model 306 of FIG. 3) representative of the plurality of resources, wherein the plurality of resources comprise a plurality of network resources. In some examples, the at least one requirement comprises a requirement selected from a group consisting of an interface type, a bandwidth, a number of routes, and a maximum cost. In some examples, the at least one constraint comprises a constraint selected from a group consisting of a same point of presence, different points of presence, a same network device, and different network devices. In some examples, the plurality of resources comprises at least one of a resource selected from a group consisting of an interface having an interface type, a link, a bandwidth associated with the link, a route, a region, a point of presence, a route distinguisher, a route target, an address, a prefix, and a network device.

In some examples, computing device 302 receives a service order instance (e.g., service order 400), the service order instance comprising the instance of the customer service model (e.g., customer service instance 404) and the instance of the resource model.

In some examples, the service order instance comprises a network service order instance. In some examples, the service order instance comprises an L2VPN service order instance or a L3VPN service order instance.

Figure 12:
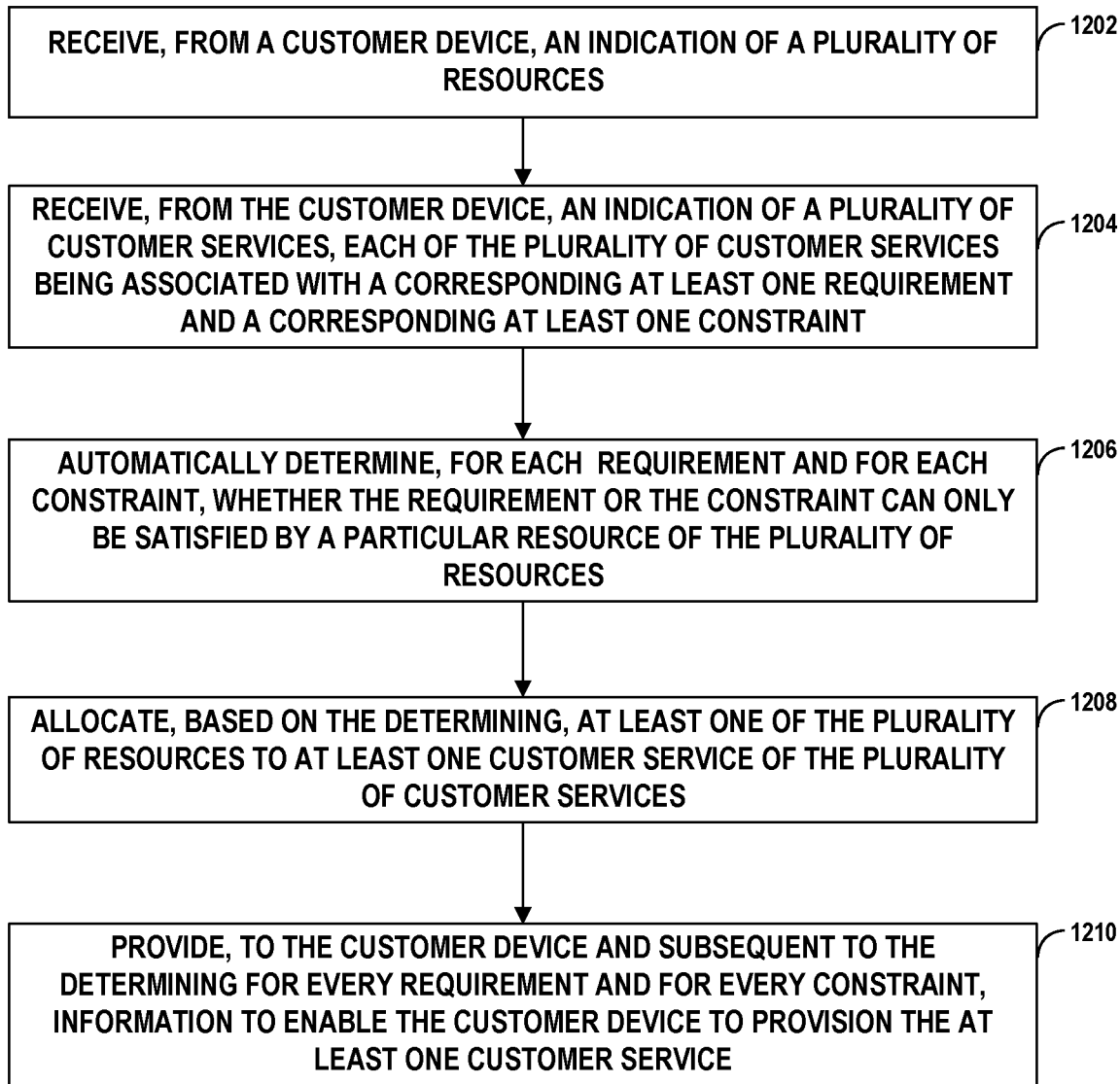
FIG. 12 is a flowchart illustrating other example techniques for placing customer services on resources according to this disclosure.

FIG. 12 is a flowchart illustrating other example techniques for placing customer services on resources according to this disclosure. Computing device 302 may receive, from a customer device, an indication of a plurality of resources (1202). For example, computing device 302 may receive, from network controller 300, an instance of network resource model 306 or network service instance 402, either of which may include the indication of a plurality of resources.

Computing device 302 may receive, from the customer device, an indication of a plurality of customer services, each of the plurality of customer services being associated with a corresponding at least one requirement and a corresponding at least one constraint (1204). For example, computing device 302 may receive, from network controller 300, customer service instance 404, which may include an indication of the plurality of customer resources.

Computing device 302 may automatically determine, for each requirement and each constraint, whether the requirement or the constraint can only be satisfied by a particular resource of the plurality of resources (1206). For example, computing device may compare free resources to each requirement and each constraint to determine whether a particular requirement or a particular constraint can only be satisfied by a particular resource.

Computing device 302 may allocate, based on the determining, at least one of the plurality of resources to at least one customer service of the plurality of customer services (1208). For example, if a particular resource must be allocated such that a particular requirement or a particular constraint is satisfied, computing device 302 may allocate that particular resource to satisfy the particular requirement or the particular constraint.

Computing device 302 may provide, to the customer device and subsequent to the determining for every requirement and for every constraint, information to enable the customer device to provision the at least one customer service (1210). For example, computing device 302 may provide to network controller 300 network service instance 402 including information to enable network controller 300 to provision the at least one customer service.

In some examples, the allocating the at least one of the plurality of resources comprises allocating to satisfy each requirement or each constraint that can only be satisfied by a respective particular resource. In some examples, computing device 302, subsequent to the allocating, determines a plurality of options for allocating at least a portion of remaining resources of the plurality of resources, the remaining resources not yet being allocated, to satisfy remaining requirements and remaining constraints, the remaining requirements and the remaining constraints not yet being satisfied. In some examples, computing device 302 outputs, for display, a representation of the at least one of the plurality of resources, each requirement or each constraint that can only be satisfied by the respective particular resource, and the plurality of options.

In some examples, computing device 302 receives, from a user, an indication of user input indicative of a selected one of the plurality of options. In some examples, computing device 302 allocates, in response to receiving the indication of the user input, the at least a portion of the remaining resources to a remaining portion of the customer services, based on the selected one of the plurality of options. In some examples, computing device 302 provides, to the customer device, information to enable the customer device to provision the remaining portion of the customer services.

In some examples, computing device 302 receives, from the customer device, a customer model comprising a new customer service. In some examples, computing device 302 determines that a remaining portion of the plurality of resources cannot satisfy at least one requirement or at least one constraint associated with the new customer service, the remaining resources not yet being allocated. In some examples, computing device 302 outputs, for display, an indication that the remaining portion of the plurality of resources cannot satisfy the at least one requirement or the at least one constraint associated with the new customer service.

In some examples, computing device 302 changes the at least one requirement or the at least one constraint associated with the new customer service, re-allocates the plurality of resources such that the at least one requirement or the at least one constraint associated with the new customer service is met, assigns a priority to each of the plurality of customer services and re-allocating the plurality of resources based on the assigned priority of each of the plurality of customer services, or re-allocates the at least a portion of the plurality of resources based on a predetermined criterion.

In some examples, the at least one requirement includes a requirement selected from a group consisting of an interface type, a bandwidth, a number of routes, and a maximum cost.

In some examples, the at least one constraint includes a constraint selected from a group consisting of a same point of presence, different points of presence, a same network device, and different network devices.

In some examples, the indication of a plurality of resources comprises an instance of a resource model. In some examples, computing device 302 maps the instance of the customer service model and the instance of the resource model, to an internal placement model maintained by the computing device. In some examples, computing device 302 inverse maps the allocated at least one resource of the plurality of resources to the at least one customer service of the plurality of customer services from the internal placement model to a format consumable by the customer device.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

Various examples have been described. These and other examples are within the scope of the following claims.

The invention claimed is:

1. A method of managing customer services, the method comprising:
   receiving, by a computing device having one or more processors and from a customer device, an indication of a plurality of resources;
   receiving, by the computing device and from the customer device, an indication of a plurality of customer services, each of the plurality of customer services being associated with at least one corresponding requirement and zero or more corresponding constraints;
   automatically determining, by the computing device and for each requirement and each of any constraint, whether the requirement or the constraint can only be satisfied by a particular resource of the plurality of resources;
   allocating, by the computing device and based on the determining, at least one resource of the plurality of resources to at least one customer service of the plurality of customer services; and
   providing, by the computing device to the customer device and subsequent to the determining for every requirement and for every of any constraint, information to enable the customer device to provision the at least one customer service.

2. The method of claim 1, wherein allocating the at least one of the plurality of resources comprises allocating to satisfy each requirement or each constraint that can only be satisfied by a respective particular resource.

3. The method of claim 1, further comprising:
subsequent to the allocating, determining, by the computing device, a plurality of options for allocating at least a portion of remaining resources of the plurality of resources, the remaining resources not yet being allocated, to satisfy remaining requirements and remaining constraints, the remaining requirements and the remaining constraints not yet being satisfied by the allocating.

4. The method of claim 3, further comprising:
outputting, by the computing device and for display, a representation of the at least one of the plurality of resources, each requirement, or each constraint that can only be satisfied by the respective particular resource, and the plurality of options.

5. The method of claim 4, further comprising:
receiving, by the computing device, an indication of user input indicative of a selected one of the plurality of options;
allocating, by the computing device and in response to receiving the indication of the user input, the at least a portion of the remaining resources to a remaining portion of the customer services, based on the selected one of the plurality of options; and
providing, by the computing device and to the customer device, information to enable the customer device to provision the remaining portion of the customer services.

6. The method of claim 1, further comprising:
receiving, by the computing device and from the customer device, a customer model comprising a new customer service;
determining, by the computing device, that a remaining portion of the plurality of resources cannot satisfy at least one requirement or at least one constraint associated with the new customer service, the remaining resources not yet being allocated by the allocating; and
outputting, for display, an indication that the remaining portion of the plurality of resources cannot satisfy the at least one requirement or the at least one constraint associated with the new customer service.

7. The method of claim 6, further comprising:
changing, by the computing device, the at least one requirement or the at least one constraint associated with the new customer service;
re-allocating, by the computing device, the plurality of resources such that the at least one requirement or the at least one constraint associated with the new customer service is met;
assigning, by the computing device, a priority to each of the plurality of customer services and re-allocating the plurality of resources based on the assigned priority of each of the plurality of customer services; or
re-allocating, by the computing device, the at least a portion of the plurality of resources based on a predetermined criterion.

8. The method of claim 1, wherein the at least one corresponding requirement comprises a requirement selected from a group consisting of an interface type, a bandwidth, a number of routes, and a maximum cost.

9. The method of claim 1, wherein the zero or more corresponding constraints comprise at least one constraint and the at least one constraint comprises a constraint selected from a group consisting of a same point of presence, different points of presence, a same network device, and different network devices.

10. The method of claim 1, wherein the indication of a plurality of resources comprises at least one of an instance of a network service model, an instance of a resource model, or both the instance of the network service model and the instance of the resource model, and wherein the indication of a plurality of customer services comprises an instance of a customer service model, the method further comprising:
mapping, by the computing device, the instance of the customer service model, and the at least one of the instance of the network service model, the instance of the resource model, or both the instance of the network service model and the instance of the resource model, to an internal placement model maintained by the computing device; and
inverse mapping the allocated at least one resource of the plurality of resources to the at least one customer service of the plurality of customer services from the internal placement model to a form consumable by the customer device.

11. A computing device comprising:
one or more processors; and
a non-transitory computer-readable medium having instructions stored thereon to cause the one or more processors to:
receive, from a customer device, an indication of a plurality of resources;
receive, from the customer device, an indication of a plurality of customer services, each of the plurality of customer services being associated with a corresponding at least one requirement and zero of more corresponding constraints;
automatically determine, for each requirement and each constraint, whether the requirement or the constraint can only be satisfied by a particular resource of the plurality of resources; and
allocate, based on the determining, at least one resource of the plurality of resources to at least one customer service of the plurality of customer services; and
provide, to the customer device and subsequent to the determining for every requirement and for every constraint, information to enable the customer device to provision the at least one customer service.

12. The computing device of claim 11, wherein the allocating the at least one of the plurality of resources comprised allocating to satisfy each requirement or each constraint that can only be satisfied by a respective particular resource.

13. The computing device of claim 11, wherein the instructions further cause the one or more processors to:
subsequent to the allocation, determine, by the computing device, a plurality of options for allocating at least a portion of remaining resources of the plurality of resources, the remaining resources not yet being allocated, to satisfy remaining requirements and remaining constraints, the remaining requirements and the remaining constraints not yet being satisfied by the allocating.

14. The computing device of claim 13, wherein the instructions further cause the one or more processors to:
output, for display, a representation of the at least one of the plurality of resources, each requirement or each constraint that can only be satisfied by the respective particular resource, and the plurality of options.

15. The computing device of claim 14, wherein the instructions further cause the one or more processors to:
receive an indication of user input indicative of a selected one of the plurality of options; allocate, in response to receiving the indication of the user input, the at least a portion of the remaining resources to a remaining portion of the customer services, based on the selected one of the plurality of options; and
provide, to the customer device, information to enable the customer device to provision the remaining portion of the customer services.

16. The computing device of claim 11, wherein the instructions further cause the one or more processors to:
receive, from the customer device, a customer model comprising a new customer service;
determine that a remaining portion of the plurality of resources cannot satisfy at least one requirement or at least one constraint associated with the new customer service, the remaining resources not yet being allocated by the allocating; and
output, for display, an indication that the remaining portion of the plurality of resources cannot satisfy the at least one requirement or the at least one constraint associated with the new customer service.

17. The computing device of claim 16, wherein the instructions further cause the one or more processors to:
change the at least one requirement or the at least one constraint associated with the new customer service;
re-allocate the plurality of resources such that the at least one requirement or the at least one constraint associated with the new customer service is met;
assign a priority to each of the plurality of customer services and re-allocating the plurality of resources based on the assigned priority of each of the plurality of customer services; or
re-allocate the at least a portion of the plurality of resources based on a predetermined criterion.

18. The computing device of claim 11, wherein the at least one corresponding requirement comprises a requirement selected from a group consisting of an interface type, a bandwidth, a number of routes, and a maximum cost.

19. The computing device of claim 11, wherein the zero or more corresponding constraints comprise at least one constraint and the at least one constraint comprises a constraint selected from a group consisting of a same point of presence, different points of presence, a same network device, and different network devices.

20. A non-transitory computer-readable medium comprising instructions for causing at least one programmable processor to:
receive, from a customer device, an indication of a plurality of resources;
receive, from the customer device, an indication of a plurality of customer services, each of the plurality of customer services being associated with a corresponding at least one requirement and zero or more corresponding constraints;
automatically determine, for each requirement and each constraint, whether the requirement or the constraint can only be satisfied by a particular resource of the plurality of resources;
allocate, based on the determining, at least one resource of the plurality of resources to at least one customer service of the plurality of customer services; and
provide, to the customer device and subsequent to the determining for every requirement and for every constraint, information to enable the customer device to provision the at least one customer service.

* * * * *